(12) United States Patent
Hamabe et al.

(10) Patent No.: US 8,498,609 B2
(45) Date of Patent: Jul. 30, 2013

(54) RADIO COMMUNICATION SYSTEM AND METHOD

(75) Inventors: Kojiro Hamabe, Minato-ku (JP); Jinsock Lee, Minato-ku (JP)

(73) Assignee: NEC Corporation, Tokyo (JP)

( * ) Notice: Subject to any disclaimer, the term of this patent is extended or adjusted under 35 U.S.C. 154(b) by 560 days.

(21) Appl. No.: 12/682,569

(22) PCT Filed: Oct. 9, 2008

(86) PCT No.: PCT/JP2008/068329
§ 371 (c)(1),
(2), (4) Date: Apr. 9, 2010

(87) PCT Pub. No.: WO2009/048088
PCT Pub. Date: Apr. 16, 2009

(65) Prior Publication Data
US 2010/0311415 A1 Dec. 9, 2010

(30) Foreign Application Priority Data
Oct. 11, 2007 (JP) ................................ 2007-265709

(51) Int. Cl.
*H04M 11/04* (2006.01)
(52) U.S. Cl.
USPC ..... 455/404.2; 455/512; 455/513; 455/414.2; 455/435.1; 455/435.2
(58) Field of Classification Search
USPC ............................ 455/12.1, 13.1, 13.2, 67.11
See application file for complete search history.

(56) References Cited

U.S. PATENT DOCUMENTS

| 7,796,948 B2 * | 9/2010 | Grosspietsch et al. .......... 455/62 |
| 2004/0097237 A1 | 5/2004 | Aoyama |
| 2006/0046765 A1 | 3/2006 | Kogure |
| 2007/0115842 A1 | 5/2007 | Matsuda et al. |

FOREIGN PATENT DOCUMENTS

| CN | 1700663 A | 11/2005 |
| JP | 2003-244053 A | 8/2003 |
| JP | 2004-166056 A | 6/2004 |
| JP | 2004-245657 A | 9/2004 |
| JP | 2006-074322 A | 3/2006 |
| WO | 2005/057973 A1 | 6/2005 |

OTHER PUBLICATIONS

"UE assistance for self-optimizing of network", NEC, T-Mobile, Jun. 25-29, 2007, 4 pages.
Communication dated Apr. 28, 2012 from the State Intellectual Property Office of P.R. China in counterpart Chinese application No. 200880111153.6 (and Japanese-language translation thereof).

\* cited by examiner

*Primary Examiner* — Olumide T Ajibade Akonai
*Assistant Examiner* — Randy Peaches
(74) *Attorney, Agent, or Firm* — Sughrue Mion, PLLC

(57) ABSTRACT

A mobile station is configured to use, a reception quality of GPS electric wave received by a mobile station, time needed in obtaining GPS location information (or the reception quality of preset television or radio broadcasting) as surrounding environmental information of the mobile station and to control, based on the surrounding environmental information, measurement of a link status (reception quality) and/or reporting of the measurement to a base station. A report from the mobile station is transmitted via the base station and a gateway to a management server which optimizes radio parameter based on the report.

15 Claims, 16 Drawing Sheets

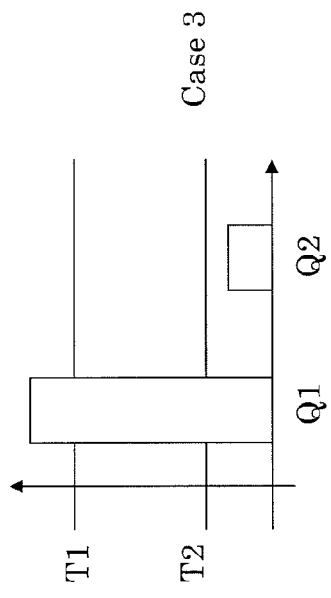
FIG. 12A Case 1
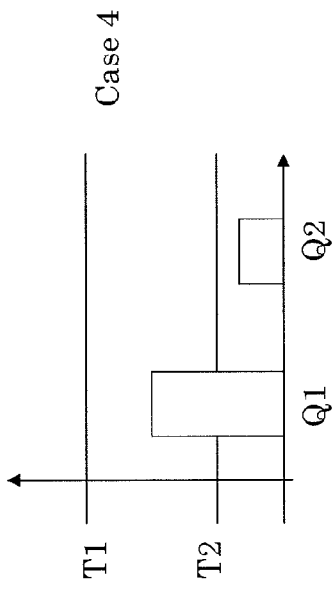
FIG.12C Case 3
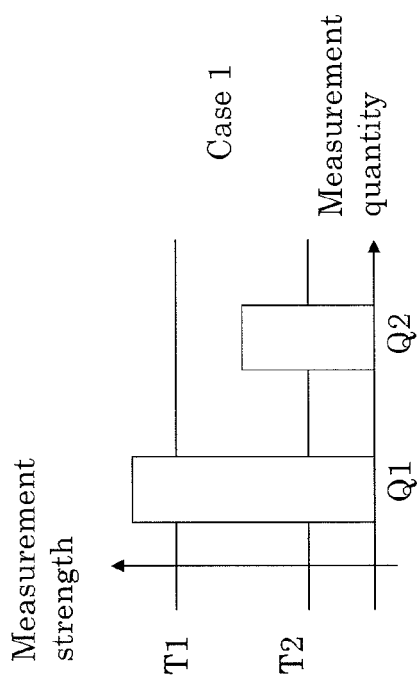
FIG. 12B Case 2
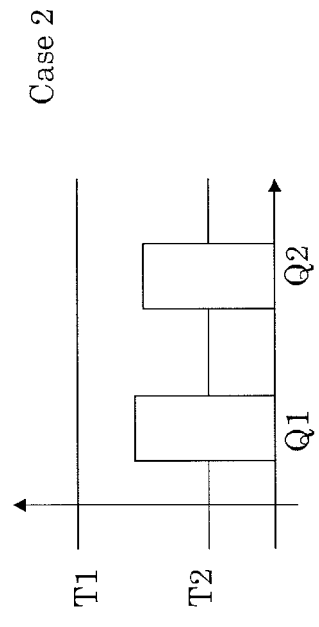
FIG. 12D Case 4

RADIO COMMUNICATION SYSTEM AND METHOD

REFERENCE TO RELATED APPLICATION

This application is based upon and claims the benefit of the priority of Japanese patent application No. 2007-265709 filed on Oct. 11, 2007, the disclosure of which is incorporated herein in its entirety by reference thereto.

This invention relates to a radio communication system and, more particularly, to a radio system and a radio method that control the reporting to the base station of monitored result of link status as obtained at a mobile station. This invention also relates to the mobile station, a program, the base station and a management server.

TECHNICAL FIELD

Background Art

Recently, as mobile phones and related services have become diversified, there is raised a demand for reducing the cost for maintenance or adjustment for optimization of the mobile communication system. Among the subjects for maintenance or adjustment for optimization, there are, for example, the transmission power of the base station and the antenna tilt angle thereof. These are sometimes termed as radio parameters (see Patent Document 1).

In general, the maintenance and adjustment are carried out based on evaluation researches that use a radio network design simulator. To improve the simulation accuracy, the information on the reception status, as actually measurement in a service area of the radio communication system, and the location information, also actually measurement, are entered to the design simulator. In the radio communication system, for example, the CDMA (Code Division Multiple Access) radio communication system, the reception quality or the reception strength of a common pilot channel, for example, is used.

In measurement of the information on the reception status, there has so far been known a method by using a dedicated measurement car or a team of experts in measurement. In addition, there has been known a method in which the information regarding the reception status is measurement by a mobile radio terminal, possessed by a general user, and the so measurement result are collected. In a configuration disclosed in Patent Document 1, a mobile radio terminal monitors the status of the link of the user communication. The status of the link satisfying a preset condition is detected as a trigger. If such trigger is detected, the mobile radio terminal acquires the reception status of the radio signal and its own location. The mobile radio terminal then transmits the status of reception and the measurement information including the own location to a management server (information collecting server). The information collecting server then internally records the actually measured information received from the mobile radio terminal.
Patent Document 1:
JP Patent Kokai Publication No. JP-P2004-166056A
Non-Patent Document 1:
"UE assistance for self-optimizing of network", 3GPP TSG-RAN WG2 R2-072432, 25-29 Jun. 2007

SUMMARY

The disclosures of Patent Document 1 and Non-Patent Document 1 are incorporated herein by reference. The following analysis is given by the present invention.

A system in which a mobile station reports monitored result of a reception status via a base station to a management server, in accordance with the description of Patent Document 1, will now be analyzed.

Based on an instruction from the management server, the base station transmits a measurement control notification (periodical type, event type or on-demand type) to the mobile station. In case of the on-demand type, the mobile station performs measurement on receipt of the measurement control notification.

In case of the periodical type, the mobile station performs measurement at a fixed period.

In case a report is made with the event type, when an event, which meets a pre-defined condition and is to become a trigger, occurs in a link status monitored by the mobile station, the mobile station reports the occurrence of the event to the base station. The events which meet the pre-defined condition are such as a radio link failure, a handover (HO) failure, a lowered throughput or a deteriorated pilot quality.

As the monitored result, reported by the mobile station, the reception status, the location of the mobile station and, in case the report is of the event type, the event sort, are transmitted. As the reception status and the own location information, the pilot reception quality and the GPS (Global Positioning System) location information of the cell currently offering a service (also termed 'serving cell') and neighboring cells are used. The temporary mobile station ID (identification), which is an identifier at L3 (RRC), and the time information, may also be included in the report. If, when the mobile station transmits monitored result of the link status to the base station, communication has become disabled due to a radio link failure or base station failure, the report buffered in the mobile station is transmitted to the base station, when the link is re-connected to enable the communication. As navigation signals from the GPS satellites, there are a P-code (Precision Code) and a C/A code (Clear and Acquisition Code), with only the C/A code being laid open for public use. As the working frequencies, two waves, namely 1575.42 MHz (L1) and 1227.60 MHz (L2), are used. The P-code and the C/A code are transmitted for L1 and the P-code is transmitted for L2, with the use of the spread spectrum technique. The signals from three GPS satellites are received to calculate the location (latitude and longitude) of a GPS reception unit, and the signals from four or more GPS satellites may be used to calculate the altitude (sea level altitude) of the GPS reception unit. It is noted that in the present application, three GPS satellites and navigation signals from the three GPS satellites are each denoted using a singular form, by a GPS satellite and a GPS signal, for example, only for the sake of simplification of description.

On receipt of a report from the mobile station, the base station transmits the report to the management server.

The management server collects the report information, and re-sets the radio parameter, such as power or antenna tilt angle.

In connection with the above system analyzed, the present inventors have found that the system is beset with the following problems:

If the indoor communication quality deteriorating information is not removed but is present mixed with the measurement outdoor result, it is difficult to optimize outdoor radio parameter with high accuracy.

It is therefore desirable to distinguish between being outdoors and being indoors to enable optimizing the radio parameter.

It is also desirable to elevate the performance for the optimization of the radio parameter carried out using the information regarding the environment of the mobile station who has made the report.

The present invention is based on the above information. It is an object of the present invention to provide a system, a method, a program, a mobile terminal, a base station and a management server that enable the radio parameter to be optimized depending on sites or environments, such as being indoors and being outdoors.

The invention may be summarized substantially as follows:

In one aspect (mode) of the present invention, there is provided a mobile terminal that controls, in accordance with a reception status of a radio signal from a preset radio transmission source other than a base station, the execution of measurement on a link status by the mobile terminal and/or the execution of reporting of the measurement result on the link status to a base station.

According to the present invention, there is also provided a mobile terminal that uses, as surrounding environment information thereof, a reception quality of GPS (Global Positioning System) wave received by the mobile terminal or time needed to obtain the GPS location information and/or the reception quality of preset television broadcasting or radio broadcasting, and controls, based on the surrounding environment information, the execution of measurement on a link status performed by the mobile terminal and/or reporting of the measurement on the link status to the base station.

According to the present invention, there is also provided a radio communication system including a base station and a mobile terminal, wherein the mobile terminal controls, in accordance with a reception status of a radio signal from a preset radio transmission source other than a base station, the execution of measurement on a link status by the mobile terminal and/or the execution of reporting of the measurement result on the link status to a base station.

According to the present invention, there is also provided a radio communication system including a base station and a mobile terminal, wherein the mobile terminal uses, as surrounding environment information thereof, a reception quality of GPS (Global Positioning System) wave received by the mobile terminal or time needed to obtain the GPS location information and/or the reception quality of preset television broadcasting or radio broadcasting, and wherein the mobile terminal controls, based on the surrounding environment information, the execution of measurement on a link status performed by the mobile terminal and/or reporting of the measurement on the link status to the base station.

According to the present invention, there is provided a radio communication method, comprising a mobile terminal controlling, in accordance with a reception status of a radio signal from a preset radio transmission source other than a base station, the execution of measurement on a link status by the mobile terminal and/or the execution of reporting of the measurement result on the link status to a base station.

According to the present invention, there is provided a radio communication method comprising:

a mobile terminal using, as surrounding environment information thereof, a reception quality of GPS (Global Positioning System) wave received by the mobile terminal or time needed to obtain the GPS location information and/or the reception quality of preset television broadcasting or radio broadcasting; and the mobile terminal controlling, based on the surrounding environment information, the execution of measurement on a link status performed by the mobile terminal and/or reporting of the measurement on the link status to the base station.

According to the present invention, there is provided a computer-readable recording medium storing a program causing a computer, forming a mobile terminal, to execute the processing comprising controlling, in accordance with a reception status of a radio signal from a preset radio transmission source other than a base station, the execution of measurement on a link status by the mobile terminal and/or the execution of reporting of the measurement result on the link status to a base station.

According to the present invention, there is also provided a base station that instructs a mobile terminal to use a reception quality of GPS (Global Positioning System) wave received by the mobile terminal or time needed to obtain the GPS location information and/or a reception quality of preset television broadcasting or radio broadcasting as surrounding environment information for the mobile terminal, instructs the mobile terminal to control, based on the surrounding environment information, the execution of the measurement on the link status of the mobile terminal and/or the execution of reporting of the measurement on the link status to the base station.

According to the present invention, there is also provided a management server that issues a measurement instruction via a base station to a mobile terminal to control, in accordance with a reception status of a radio signal from a radio transmission source other than the base station, the execution of measurement on a link status and/or the execution of reporting of the measurement result on the link status, the radio signal enabling determining whether the mobile terminal is located indoors or outdoors, based on a reception status thereof at the mobile terminal;

receives a report on the measurement result from the mobile terminal via the base station to distinguish between the mobile station being located indoors and the mobile station being located outdoors, based on a report of the measurement result to optimize one or more radio parameters.

According to the present invention, measurement or reporting may selectively be made depending on the site or environment, such as indoor or outdoor site or environment, thus providing for optimization of radio parameter depending on the site or environment.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 12A to 12D illustrate the magnitude relation of the serving cell quality Q1, electric field strength Q2 of the GPS electric wave and threshold values T1 and T2.

PREFERRED MODES

Figure 1:
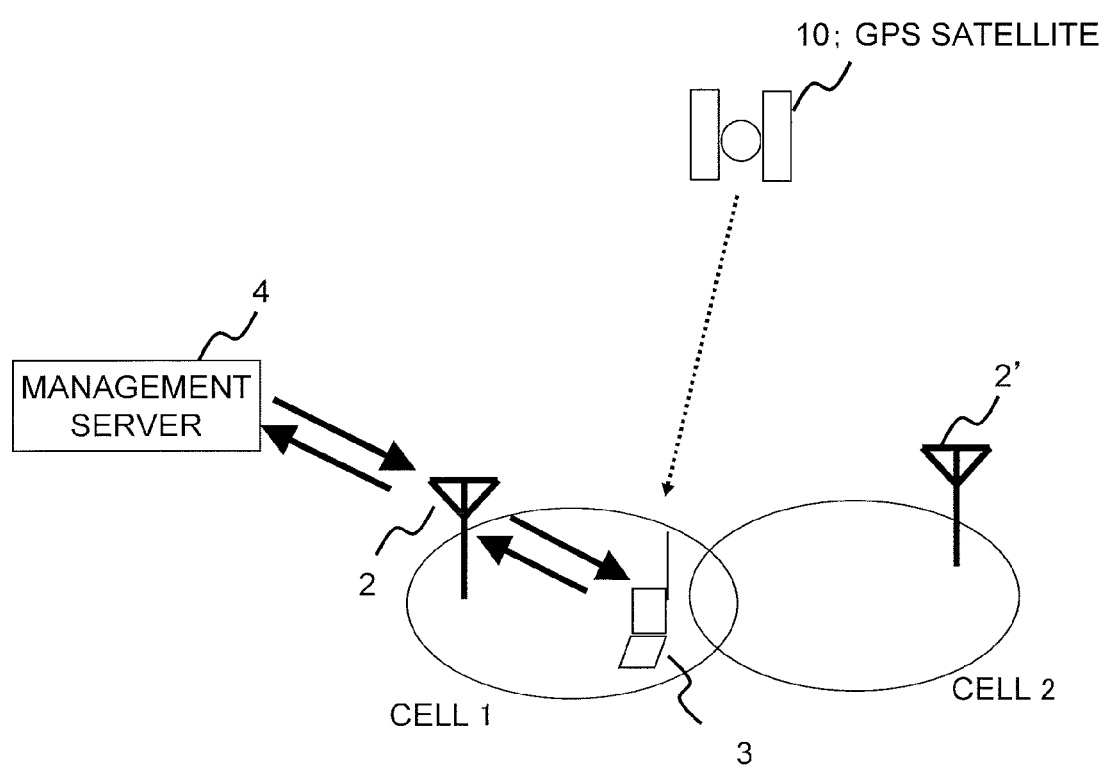
FIG. 1 is a diagram illustrating an exemplary embodiment of the present invention.

Exemplary embodiments of the present invention will now be described. FIG. 1 illustrates an example of the principles of the exemplary embodiment of the present invention. In the present exemplary embodiment, a mobile terminal (mobile station) controls, based on the environment information (GPS information), the execution of measurement of a link status and/or the execution of reporting of the measurement.

The link status includes a state of a link, such as a link error or a link failure, as determined from the reception quality, such as lowered reception level of a pilot signal of the associated link or another link.

In the present exemplary embodiment, the mobile station 3 periodically repeats the sequence of receiving an electric wave from a GPS satellite 10 to obtain the GPS location information.

If the time needed for the mobile station 3 to obtain the GPS location information is not less than a preset value, it is determined that the mobile station is located indoors. In this case, the measurement on the link status is stopped, or reporting of measurement is stopped. In the present exemplary embodiment, reporting of the result of outdoor measurement is selectively performed.

Or, if the GPS electric wave reception level by the mobile station 3 is not higher than a preset threshold value, it is determined that the mobile station is located indoors. In this case, the measurement on the link status is stopped, or the reporting of the measurement is stopped. In the present exemplary embodiment, reporting of the result of outdoor measurement is selectively performed.

In another exemplary embodiment of the present invention, if the time needed for the mobile station 3 to obtain the GPS location information is shorter than the preset value, it is determined that the mobile station is located outdoors. In this case, the measurement on the link status is stopped, or the reporting of the measurement is stopped. In the present exemplary embodiment, reporting of the result of the indoor measurement is selectively performed.

If the reception level of the GPS electric wave by the mobile station 3 exceeds a preset threshold value, it is determined that the mobile station is located outdoors. In this case, the measurement on the link status is stopped, or the reporting of the measurement is stopped. In the present exemplary embodiment, reporting of the indoor measurement result is selectively performed.

In another exemplary embodiment of the present invention, the mobile station may control measurement and reporting based on a radio signal source other than the GPS electric wave. These radio signal source may be exemplified by a terrestrial digital TV broadcasting, analog TV broadcasting, radio broadcasting or the like. It is noted that the radio transmission source may transmit a signal using a frequency lower than that of the base station 2.

According to the present invention, being indoors and being outdoor may substantially be distinguished from each other depending on whether or not the GPS location information can be obtained. It is thus possible to make selective measurement and reporting outdoors where the GPS location information may be obtained, for example. By so doing, indoor communication information with degraded quality may be eliminated to efficiently improve the quality of outdoor communication. According to the present invention, it is possible to distinguish between indoors and outdoors to render it possible to optimize a radio parameter. In addition, according to the present invention, it is possible to elevate the performance of optimization of the radio parameter performed, using the environment information of the mobile station which has reported the measurement.

Exemplary Embodiments

Figure 2:
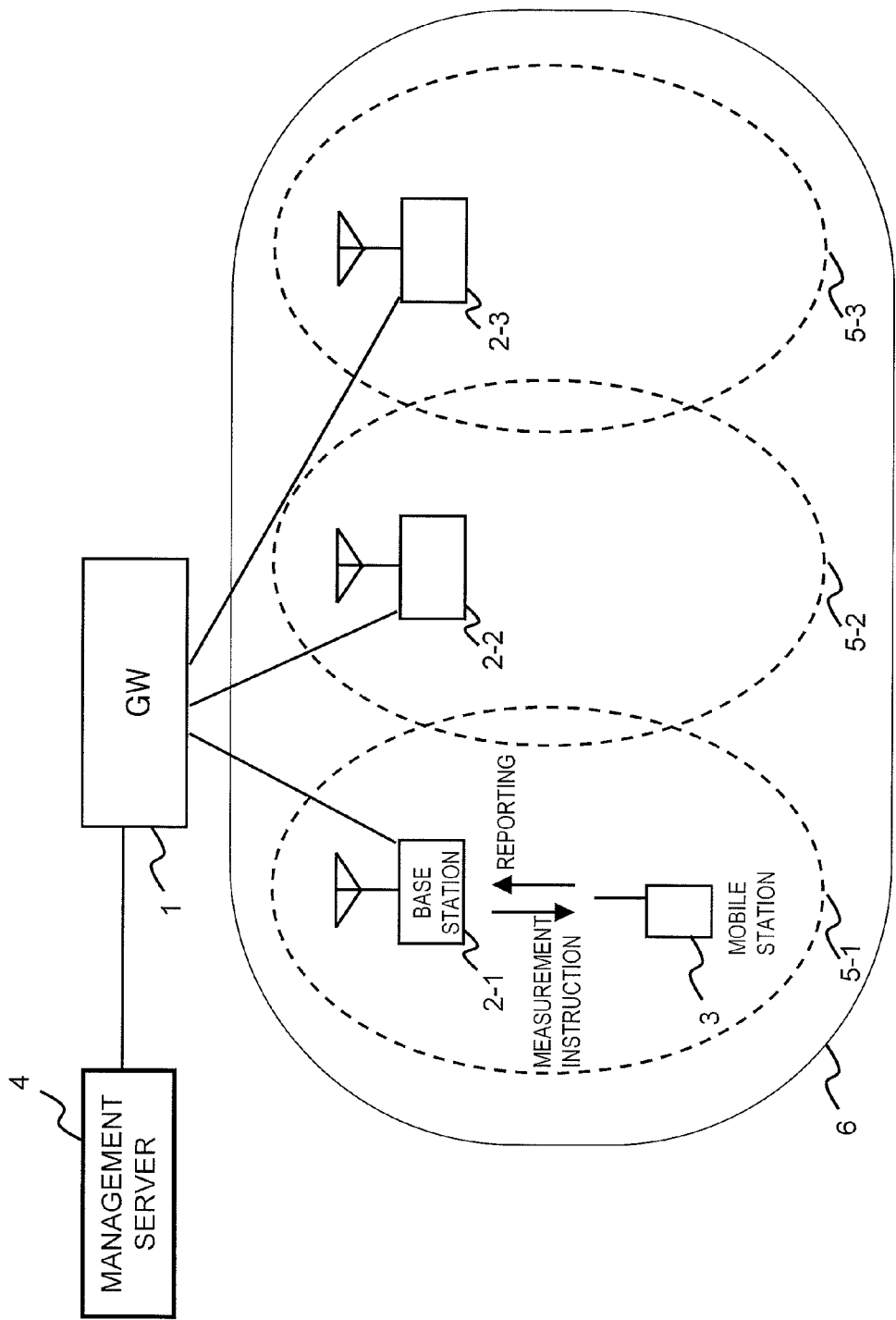
FIG. 2 is a diagram showing a system configuration of an exemplary embodiment of the present invention.

FIG. 2 is a diagram shows a system configuration of an exemplary embodiment of the present invention. Referring to FIG. 2, in a system of the present exemplary embodiment, there are provided a plurality of base stations (2-1, 2-2 and 2-3), a gateway (GW) 1 connected to these base stations, and a management server 4 connected to the gateway 1.

The base stations (2-1, 2-2 and 2-3) each receive a measurement instruction from the management server 4 to transmit an instruction to the mobile stations 3 served by the management server 4 to carry out measurement. The measurement instruction may be classified into a periodical type, an event type and an on-demand type, only by way of illustration. In the case of the periodical type, the mobile station 3 performs periodically a measurement to report the measurement result. In the case of the on-demand type, the mobile station reports the pilot reception quality of a serving cell and neighboring cells, GPS location information, the temporary mobile station identification (TMSI) information, and time, when the measurement instruction is received. In the case of the event type, the report information transmitted from the mobile station 3 to the base station may include sort of the event that has occurred, pilot reception quality of the serving cell and neighboring cells, GPS location information, temporary mobile station identification (TMSI) information, and time, when a preset event, such as a radio link failure, occurs.

In the present exemplary embodiment, the measurement on the link status and reporting of the measurement result are controlled depending on the time needed to obtain the GPS location information or on the reception level of the GPS electric wave. Alternatively, the measurement on the link status and reporting of the measurement result may be controlled depending on the reception quality of the terrestrial digital broadcasting, analog TV broadcasting or radio broadcasting.

In the following, the base station, mobile station and the management server in the system shown in FIG. 2 will be described with reference to FIGS. 3 to 5. It is noted that the configuration below described is schematically shown as being functionally divided into a plurality of blocks, only to assist in understanding. Hence, the present invention is not to be limited to the following configuration.

Figure 3:
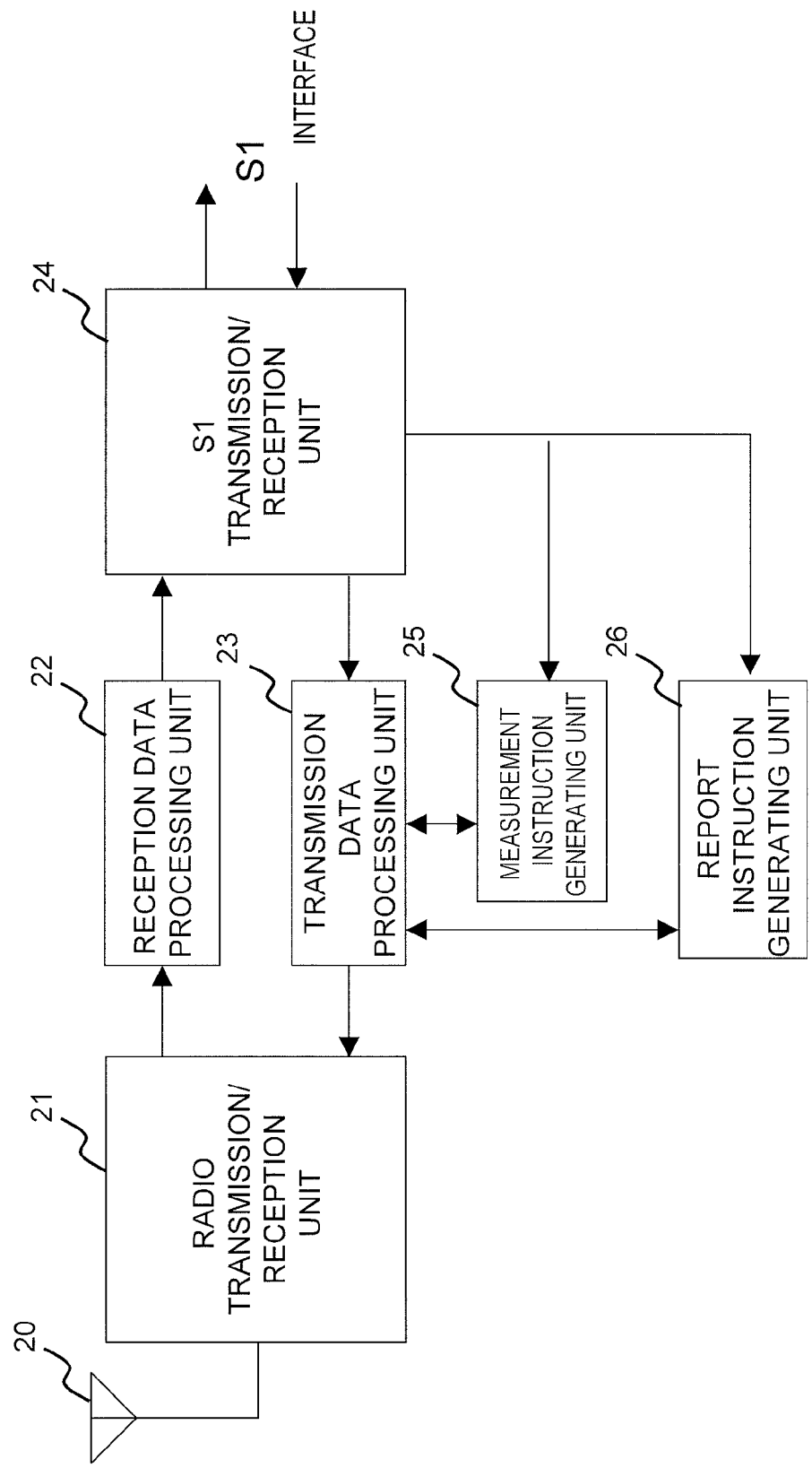
FIG. 3 is a diagram showing a configuration of a base station of the exemplary embodiment of the present invention.

FIG. 3 is a diagram showing an example of the configuration of a base station. Referring to FIG. 3, the base station includes an antenna 20, a radio transmission/reception unit 21, a reception data processing unit 22, a transmission data processing unit 23, an S1 transmission/reception unit 24, a measurement instruction generation unit 25 and a report instruction generation unit 26. These component elements generally possess the following functions:

The transmission data processing unit 23 performs error-correction coding, followed by data modulation, on transmission data, and converts the resulting data into an analog signal. In the case of CDMA, the conversion into the analog signal is performed after spreading the spectrum of the data with a spreading code. A transmission unit, not shown, of the radio transmission/reception unit 21 amplifies the power of an RF signal, obtained on modulation and frequency conversion of transmission data from the transmission data processing unit 23, and supplies the resulting power-amplified signal via a duplexer, not shown, to the antenna 20. A signal received over the antenna 20 is supplied via the duplexer, not shown, to a reception unit, not shown, of the radio transmission/reception unit 21, where the received RF signal is amplified, frequency-converted and demodulated. The resulting signal is supplied to the reception data processing unit 22.

The reception data processing unit 22 converts the reception signal, e.g., the analog signal, into a digital signal, and processes the digital signal with data demodulation, error-correction decoding. In the case of the CDMA, the data demodulation, error-correction decoding are performed after reverse spreading and rake synthesis, for example. The reverse spreading is performed with the use of the same spreading code as that of the transmission signal. The reception data processing unit 22 also sends the report information on monitored result of the reception data, from the S1 transmission/reception unit 24 via a gateway (1 of FIG. 2) to a management server (4 of FIG. 2).

The measurement instruction generation unit 25 generates a measurement instruction that is to be transmitted to a mobile station. For example, the measurement instruction generation unit 25 generates, based on a measurement instruction issued from the management server 4, as later described with reference to FIG. 5, a measurement instruction for a mobile station that has set a radio link in a cell targeted for measurement. The measurement instruction at least includes the cell targeted for measurement and measurement items.

The report instruction generation unit 26 notifies a report instruction of the measurement result via the transmission data processing unit 23 and the radio transmission/reception unit 21 to the mobile station.

It is noted that the base station may use a frequency band lower than the radio frequency of a radio signal source, such as GPS electric wave received by the mobile station.

Figure 4:
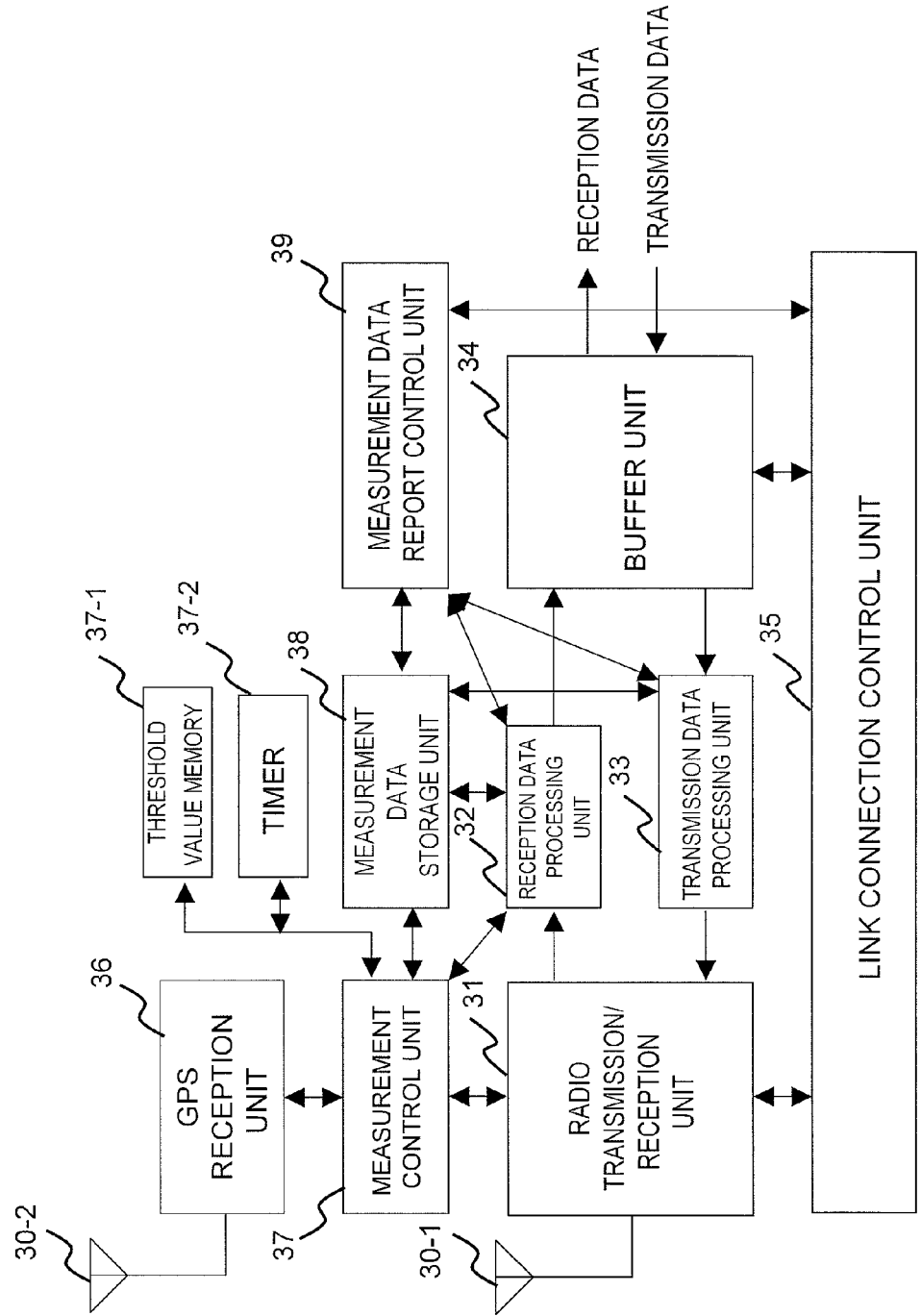
FIG. 4 is a diagram showing a configuration of a mobile station of the exemplary embodiment of the present invention.

FIG. 4 is a diagram showing an example of the configuration of the mobile station. Referring to FIG. 4, the mobile station includes a radio transmission/reception unit 31, a reception data processing unit 32, a transmission data processing unit 33, a buffer unit 34, a link connection control unit 35, a GPS reception unit 36, a measurement data storage unit 38 and a measurement data report control unit 39. These component elements possess the following functions. The buffer unit 34 stores transmission data and reception data. It is noted that, in FIG. 3, the buffer unit 34 is shown as being a single unit. However, the buffer unit 34 may, of course, be separately constructed as a transmission data buffer unit and a reception data buffer unit.

The transmission data, stored in the buffer unit 34, is processed by the transmission data processing unit 33 with error-correction coding and data modulation, and subsequently converted into an analog signal. In the case of CDMA, the conversion into the analog signal is to be performed after the spectrum spreading with the spreading code. A transmission unit, not shown, of the radio transmission/reception unit 31 processes the transmission data from the transmission data processing unit 33 with modulation and frequency conversion to generate an RF signal. The transmission unit amplifies the power of the RF signal and supplies the resulting power-amplified signal via duplexer, not shown, to an antenna 30-1. A reception unit, not shown, of the radio transmission/reception unit 31 receives the signal from the antenna 30-1, via duplexer, not shown. The reception unit amplifies, frequency-converts and demodulates the received RF signal to supply the resulting demodulated signal to the reception data processing unit 32.

The reception data processing unit 32 converts the reception signal into a digital signal and subsequently processes the resulting digital signal with data demodulation, error-correction decoding to store the resulting signal in the buffer unit 34. In the case of the CDMA, the data demodulation, error correction and decoding may be carried out only after reverse spectrum spreading by the same spreading code as that of the transmission signal, followed by rake synthesis, for example. The reception data, temporarily stored in the buffer unit 34, is read out so as to be used for respective applications.

The link connection control unit 35 exercises control between the mobile station and the base station. This control may be exemplified by establishment of link connection, re-send control at the time of error occurrence, such as time-out, maintaining connection or disconnection.

The GPS reception unit 36 receives a signal from a GPS satellite (10 of FIG. 1) over an antenna 30-2 to calculate the location information (latitude, longitude and elevation).

A measurement control unit 37 measures (monitors) the status of the link, such as reception status, based on a measurement instruction received by the radio transmission/reception unit 31, and stores the measurement result (monitored result) in the measurement data storage unit 38. It is noted that the measurement instruction is transmitted from the base station. For example, the items such as measurement result (monitored result), location information obtained by the GPS reception unit 36, mobile station ID information (TMSI), time information and so forth, are stored in a manner where the items are associated with each other, for subsequent reporting. By way of measurement on the link status, the measurement control unit 37 may find a reception level of a pilot signal (reception power) or a ratio of reception power and interference (Ec/Io) as a reception power quality.

The measurement control unit 37 also controls whether or not the measurement is to be executed and whether or not a report is to be made, based on the magnitude relation between the time needed for acquisition of the GPS location information by the GPS reception unit 36 and a preset time duration, or on the magnitude relation between the GPS signal reception level and a threshold value.

In a threshold value memory 37-1, a threshold value for comparison of the strength of electric field of the GPS electric wave, for example, is stored. The time-out information of a timer 37-2 is also stored as the threshold value information. As regards these threshold values, a standard value or a default value may be stored beforehand in the threshold value memory 37-1. Alternatively, the threshold value may be included in the control information transmitted to the mobile station from the base station to which the mobile station has made its position registration, for example. In this case, the control information (threshold value information) from the base station, as received by the radio transmission/reception unit 31 and the reception data processing unit 32, are stored via the measurement control unit 37 in the threshold value memory 37-1.

The timer 37-2 is used for management of time needed in acquisition of the GPS location information in the GPS reception unit 36, measurement of time needed in obtaining the GPS location information, or for management of the period of measurement. A plurality of timers may be provided for the sorts of time durations to be managed.

On receipt of a notification from the measurement control unit 37 of the magnitude relation between the time duration of acquisition of the GPS location information and a preset time, the measurement data report control unit 39 exercises control so as not to report even on occurrence of a report event, for example. Alternatively, on receipt of a notification from the measurement control unit 37 of the magnitude relation of the GPS reception level and the threshold value, the measurement data report control unit exercises control so as not to report even on occurrence of a report event, for example.

The measurement data report control unit 39 exercises control for transmitting or not transmitting a report on the measurement result, based on the status of the link connection of the link connection control unit 35. On detection of a radio link failure by the link connection control unit 35, the measurement data report control unit 39 may stop transmitting a report on measurement result stored in the measurement data storage unit 38 but may transmit the report when a radio link is re-established or at a preset timing following the re-establishment. In order to distribute the traffic concentration of measurement reports, transmission of the measurement reports to the base station may be made stochastically such as by making a measurement report at a preset probability, such as at a probability of 10%.

The transmission data processing unit 33 receives an instruction from the measurement data report control unit 39, that is, an instruction as to whether reporting of the measurement result is to be made or such reporting is to be inhibited. If the reporting is to be made, the transmission data processing unit 33 reads the measurement result, GPS location information, temporary mobile station ID information (TMSI) or time which are stored in the measurement data storage unit 38. The transmission data processing unit combines the read data, such as the temporary mobile station ID information (TMSI), as a report, and transmits the combined data (report) from the radio transmission/reception unit 31. It is noted that at least part of the processing by the measurement control unit 37 and the measurement data report control unit 39 may, as a matter of course, be implemented by a program being run on a computer that forms the mobile station.

Figure 5:
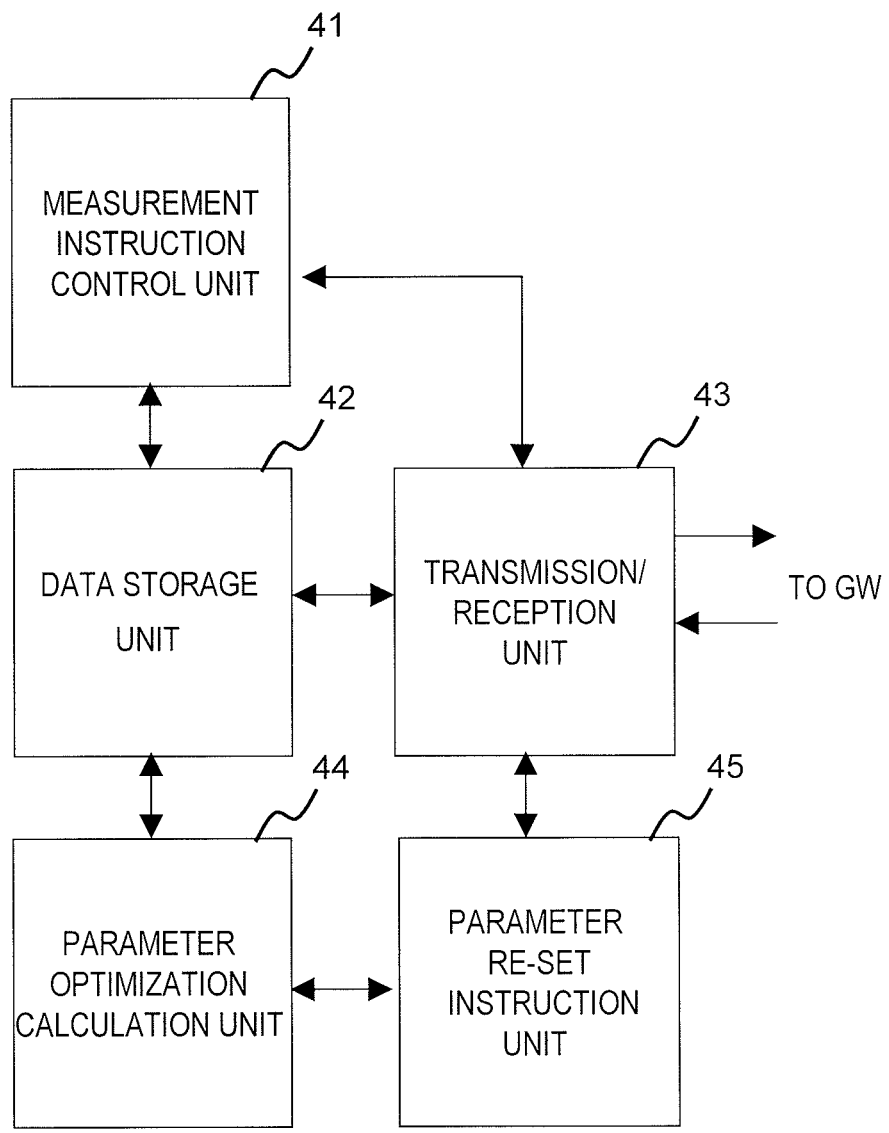
FIG. 5 is a diagram showing a configuration of a management server of the exemplary embodiment of the present invention.

FIG. 5 is a diagram showing an example configuration of the management server 4. Referring to FIG. 5, the management server 4 includes a measurement instruction control unit 41, a data storage unit 42, a transmission/reception unit 43, a parameter optimization calculation unit 44, and a parameter re-set instruction unit 45. These respective component units possess the following functions:

The measurement instruction control unit 41 issues a measurement instruction via the base station to the mobile station. The measurement instruction includes an instruction as to whether the measurement is to be performed as a periodical type, an event type, or as an on-demand type, and items to be measured. The measurement instruction control unit 41 also sets the location information acquisition permission control information (flag) in the measurement instruction (measurement control notification) to exercise control based on whether or not the location information can be obtained The measurement instruction from the measurement instruction control unit 41 is sent from the transmission/reception unit 43 to a gateway (GW device) (1 of FIG. 2) and then transmitted to the base station. The measurement instruction is wirelessly transmitted from the base station to the mobile station in the cell.

The transmission/reception unit 43 receives the report information from the mobile station via the base station and the gateway (GW device) (1 of FIG. 2), and stores the received report information in the data storage unit 42.

The parameter optimization calculation unit 44 reads the report information from the data storage unit 42 and, based on the report information, calculates a radio parameter, such as the power of a corresponding base station, or the antenna tilt angle of the base station, by way of optimization. In case the radio parameter, newly calculated by the parameter optimization calculation unit 44, differs from the radio parameter as already set, the parameter re-set instruction unit 45 sends a parameter re-set instruction via the gateway (1 of FIG. 2) to the base station. Based on the parameter re-set instruction received, the base station sets the base station power, antenna tile angle of the base station, or the like, based on the parameter re-set instruction received.

In the present exemplary embodiment, the parameter optimization calculation unit 44, selectively receiving the report of measurement result from, for example, the indoor mobile station, may optimize the outdoor radio parameter with the indoor communication information of deteriorated quality being excluded beforehand. Alternatively, the parameter optimization calculation unit may selectively receive the report of the measurement result from the indoor mobile station.

Figure 6:
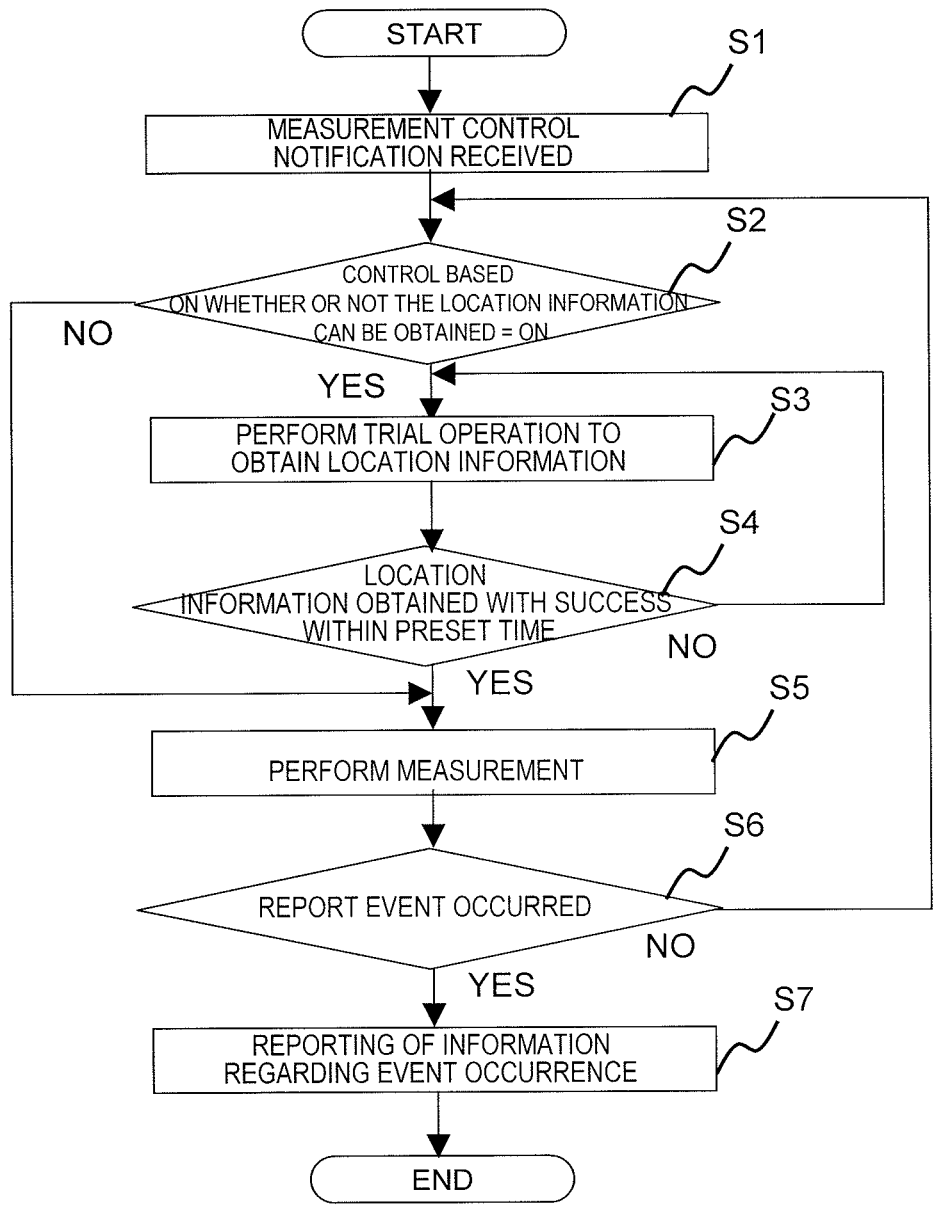
FIG. 6 is a flowchart illustrating the control of the exemplary embodiment of the present invention.

FIG. 6 illustrates the operation of exemplary embodiment 1 of the present invention. The operation of the present exemplary embodiment will now be described with reference to FIG. 4 showing the configuration of the mobile station and to FIG. 6.

The base station receives a measurement instruction (measurement control notification) from the base station (step S1). More specifically, the measurement control unit 37 of the mobile station inputs a measurement instruction from the base station received via the radio transmission/reception unit 31 and the reception data processing unit 32.

In case the location information acquisition permission control is ON (YES of step Y2), the mobile station performs a trial operation to obtain the GPS location information (step S3). More specifically, the measurement control unit 37 of the mobile station analyzes a measurement instruction (measurement control notification) received from the base station. In case the location information acquisition permission control information (flag) in the measurement instruction, for control based on whether or not the location information can be obtained is set to ON, the measurement control unit 37 requests acquisition of the GPS location information to the GPS reception unit. At this time point, the measurement control unit 37 starts the timer 37-2. The location information acquisition permission control information (flag) in the measurement instruction, is stored and managed by the measurement instruction control unit 41 of the management server (see FIG. 5) and notified via gateway to the base station. The location information acquisition permission control information is then transmitted from the measurement instruction generation unit 25 of the base station (see FIG. 3) via the radio transmission/reception unit 21 and the antenna 20 as a measurement instruction to the mobile station over antenna 20.

In case the GPS location information has been obtained within a preset time period (YES of step S4), it is determined that the mobile station is located outdoors. The status of the link is then measurement (step S5). In more detail, in case the measurement control unit 37 of the mobile station has received the notification of the completion of calculation of the GPS location information from the GPS reception unit 36 before time-out of the timer 37-2, the measurement control unit 37 measures a link status, such as a reception level of a pilot signal from the base station. It is noted that the timeout time of the timer has been set to the preset value. In case the position acquisition permission control information is OFF (NO of step S2), no trial operation is made to obtain the GPS location information. Instead, the processing jumps to a step S5 to perform the measurement.

In case the GPS location information has not been obtained within the preset time (NO of step S4), the processing returns to the step S2. At the next period, the measurement control unit 37 of the mobile station requests the acquisition of the GPS location information.

On occurrence of a report event (step S6), the mobile station reports on the information on event occurrence (step S7). By the occurrence of the report event is meant the occurrence of an event that is to be a trigger for reporting the measurement result to the base station. The event may be exemplified by a report instruction of measurement result, transmitted from the report instruction generation unit 26 of the base station, a radio link failure, a handover failure, a case in which measurements has been made a preset number of times, or timeout of the timer that manages the timing of the measurement reports.

The measurement data report control unit 39 prepares a report on the measurement result from measurement data stored in the measurement data storage unit 38, the GPS location information and from time, for example. The measurement data report control unit wirelessly transmits the report from antenna 30-1 to the base station via the transmission data processing unit 33 and via the radio transmission/reception unit 31.

If the mobile station is located outdoors, the strength of the electric field (or the reception power) of the electric wave transmitted from the GPS (GPS electric wave) is strong, such that the location information may be calculated in a shorter time.

If conversely the mobile station is located indoors, the GPS electric wave is transmitted into the inside of a building through e.g. walls, and hence is severely attenuated. The electric field of the GPS electric wave is thus low in strength. Hence, if the location information is to be calculated with the same high accuracy as that when the mobile station is located outdoors, the GPS electric wave has to be received for a longer period of time and a lot of calculations needs to be performed. As a result, it takes much time to obtain the location information.

In the first exemplary embodiment, no location information may be obtained indoors within a preset time period. No measurement or report is made, such that measurement are carried out only outdoors.

Figure 7:
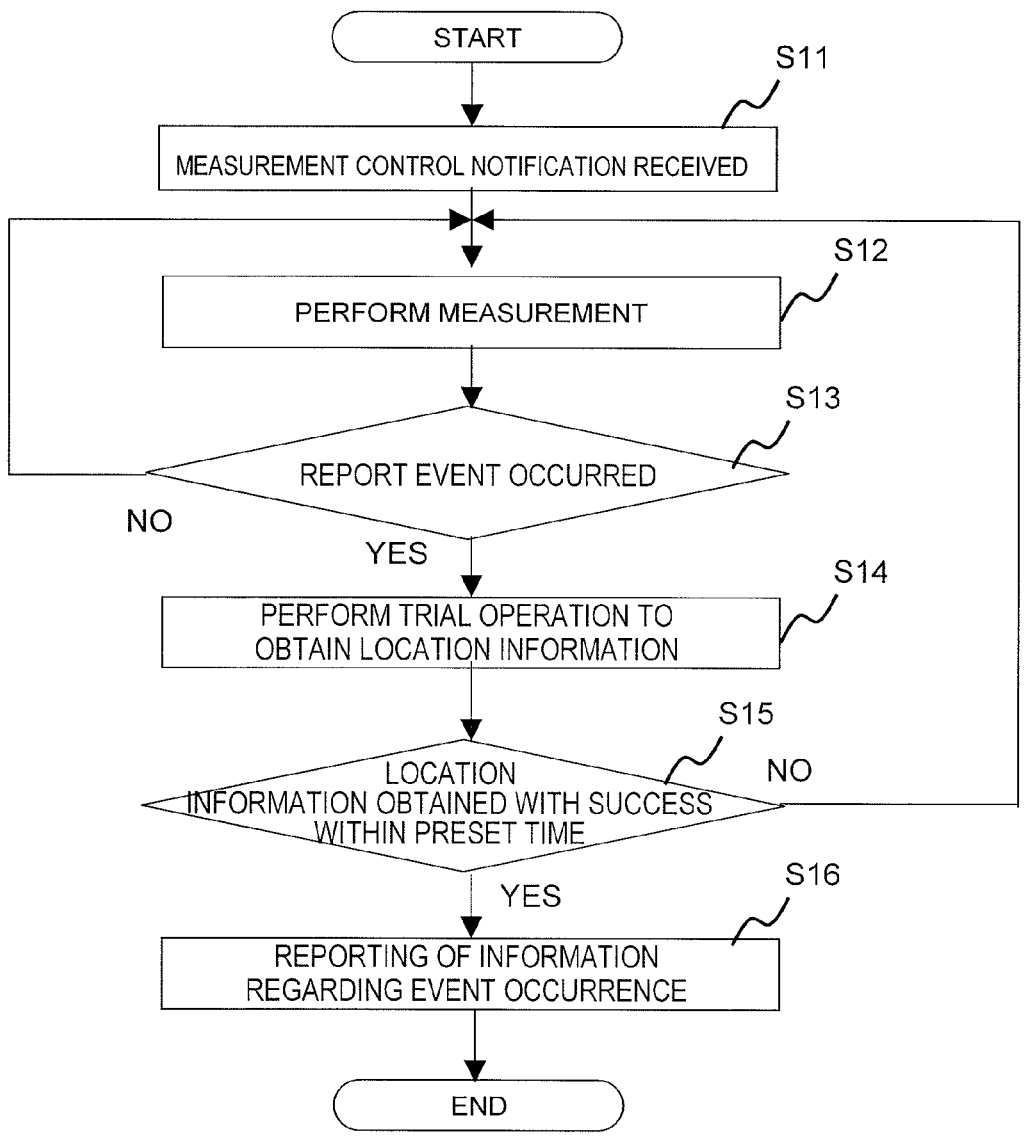
FIG. 7 is a flowchart illustrating the control of exemplary embodiment 2 of the present invention.

If, in a second exemplary embodiment of the present invention, the time needed in obtaining the GPS location information on occurrence of a report event is longer than a preset value, the mobile station stops reporting to the base station. FIG. 7 illustrates the operation of the second exemplary embodiment. The operation of the present exemplary embodiment is now described with reference to FIGS. 4 and 7.

The mobile station receives a measurement instruction (measurement control notification) from the base station (step S11). More specifically, the measurement control unit 37 of the mobile station inputs a measurement instruction received from the base station via the radio transmission/reception unit 31 and the reception data processing unit 32.

The mobile station measures a link status, such as a reception level of a pilot signal, from the base station (step S12). The measurement control unit 37 of the mobile station measures e.g., the reception level of the pilot signal from the base station as received by the radio transmission/reception unit and the reception data processing unit 32. The measurement result is stored in the measurement data storage unit 38.

On occurrence of a report event (step S13), a trial operation is performed to obtain the GPS location information (step S14). The measurement control unit 37 requests the GPS reception unit 36 to obtain the GPS location information. At this time point, the measurement control unit 37 starts the timer 37-2. By the occurrence of a report event is meant the occurrence of an event that is to be a trigger for transmitting the report of the measurement result to the base station, as previously mentioned. This event may be exemplified by an instruction for reporting the measurement result transmitted from the report instruction generation unit 26 of the base station, occurrence of a radio link failure or a handover failure, a case in which measurements have been made a preset number of times, or timeout of a timer that manages the timing of the reports for measurement.

If, in the mobile station, the GPS location information has been obtained within a preset time period (YES of step S15), it is determined that the mobile station is located outdoors, and the information on the event occurrence is reported (step S16). In more detail, when the measurement control unit 37 of the mobile station has received a notice of the end of calculations of the GPS location information from the GPS reception unit 36 before timeout of the timer 37-2, the measurement control unit instructs the measurement data report control unit 39 to make a measurement report. The measurement data report control unit 39 prepares a report on the measurement result from measurement data, GPS location information and time, as stored in the measurement data storage unit 38. The measurement data report control unit wirelessly transmits the report to the base station via the transmission data processing unit 33 and the radio transmission/reception unit 31 over antenna 30-1.

There is imposed limit on improving the indoor communication quality. It is however desirable that a high communication quality may be obtained everywhere outdoors. In the present exemplary embodiment, the indoor environment may approximately be distinguished from the outdoor environment based on whether or not the GPS location information can be obtained. It is only when the mobile station is located outdoors, thus allowing acquisition of the GPS location information, that the measurement or the report is performed. This may allow removal of the indoor communication information of the deteriorated quality as well as efficient improvement of the quality of the outdoor communication.

Conversely, it is also possible to concentrate on searching the indoor performance, such as throughput.

The mobile station may also add the GSP information and make a report to the base station only when the GPS location information can be obtained within a preset time period. The management server may then distinguish the indoor environment from the outdoor environment based on the presence or absence of the additional information.

In the second exemplary embodiment, no location information may be obtained indoors within a preset time period, such that no report is made. A report is made only when the mobile station is located outdoors.

Figure 8:
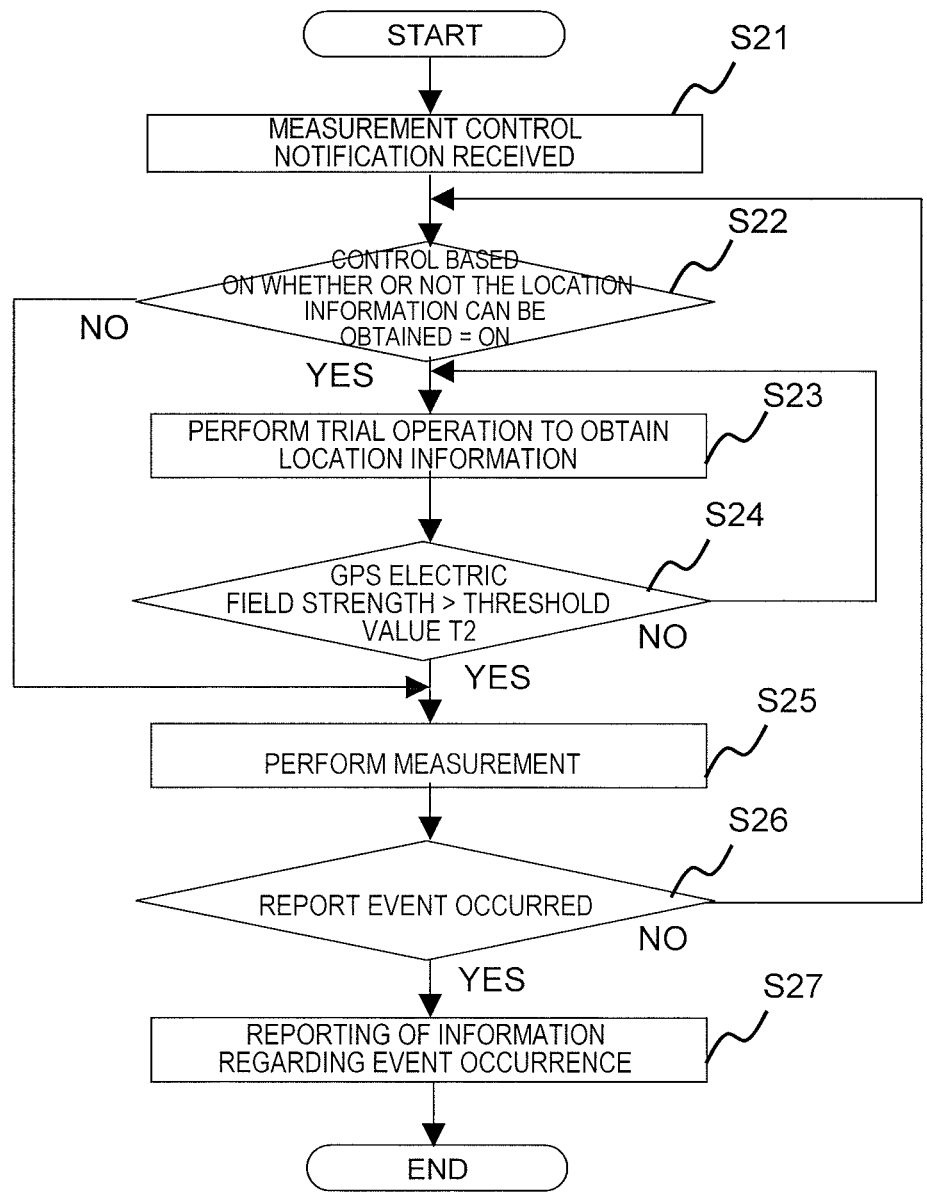
FIG. 8 is a flowchart illustrating the control of exemplary embodiment 3 of the present invention.

FIG. 8 illustrates exemplary embodiment 3 of the present invention. The operation of the present exemplary embodiment will now be described with reference to FIGS. 5 and 8.

The mobile station receives a measurement control notification from the base station (step S21). More specifically, the measurement control unit 37 of the mobile station inputs a measurement instruction from the base station received via the radio transmission/reception unit 31 and the reception data processing unit 32.

In case the location information acquisition permission control is ON (YES of step S22), the mobile station performs a trial operation to get the GPS location information and make measurement of the electric field strength of the GPS electric wave (step S23). More specifically, the measurement control unit 37 of the mobile station analyzes a measurement instruction received from the base station. In case the location information acquisition permission control information (flag) in the measurement instruction is set to ON, the measurement control unit requests the GPS reception unit 36 to obtain the GPS location information.

In case the strength of the electric field of the GPS electric wave is not less than a preset threshold value (YES of step S24), it is determined that the mobile station is located outdoors. The mobile station measures a link status, such as a reception level of a pilot signal from the base station (step S25). In more detail, in case the strength of the electric field of the GPS electric wave from the GPS reception unit 36 is greater than a threshold value T2, the measurement control unit 37 of the base station measures a link status, such as a reception level of a pilot signal from the base station. If the position acquisition permission control information is set to OFF (NO of step S22), processing jumps to a step S25 to perform the measurement without performing a trial operation to get the GPS location information or to measure the strength of the electric field of the GPS electric wave.

When the GPS electric field strength is less than or equal to the threshold value T2 (NO of step S24), processing returns to the step S22. The measurement control unit 37 of the mobile station requests acquisition of the GPS location information at the next period.

On occurrence of a report event (YES of step S26), the mobile station reports the information on the event occurrence (step S27). If no report event occurs, processing returns to the step S22. By the occurrence of a report event is meant the occurrence of an event that is to be a trigger for transmitting the report of the measurement result to the base station. Examples of this event include an instruction for reporting the measurement result transmitted from the report instruction generation unit 26, an occurrence of a radio link failure or a handover failures, a case wherein measurement have been made a preset number of times, and an occurrence of timeout of a timer that manages the timing of the reports for measurement. The measurement control unit 37 of the base station instructs the measurement data report control unit 39 to make measurement and to report the measurement result. The measurement data report control unit 39 prepares the report on the measurement result, from e.g., the measurement data, GPS location information and time, as stored in the measurement data storage unit 38, and wirelessly transmits the report to the base station over antenna 30-1 via the transmission data processing unit 33 and via the radio transmission/reception unit 31.

Figure 9:
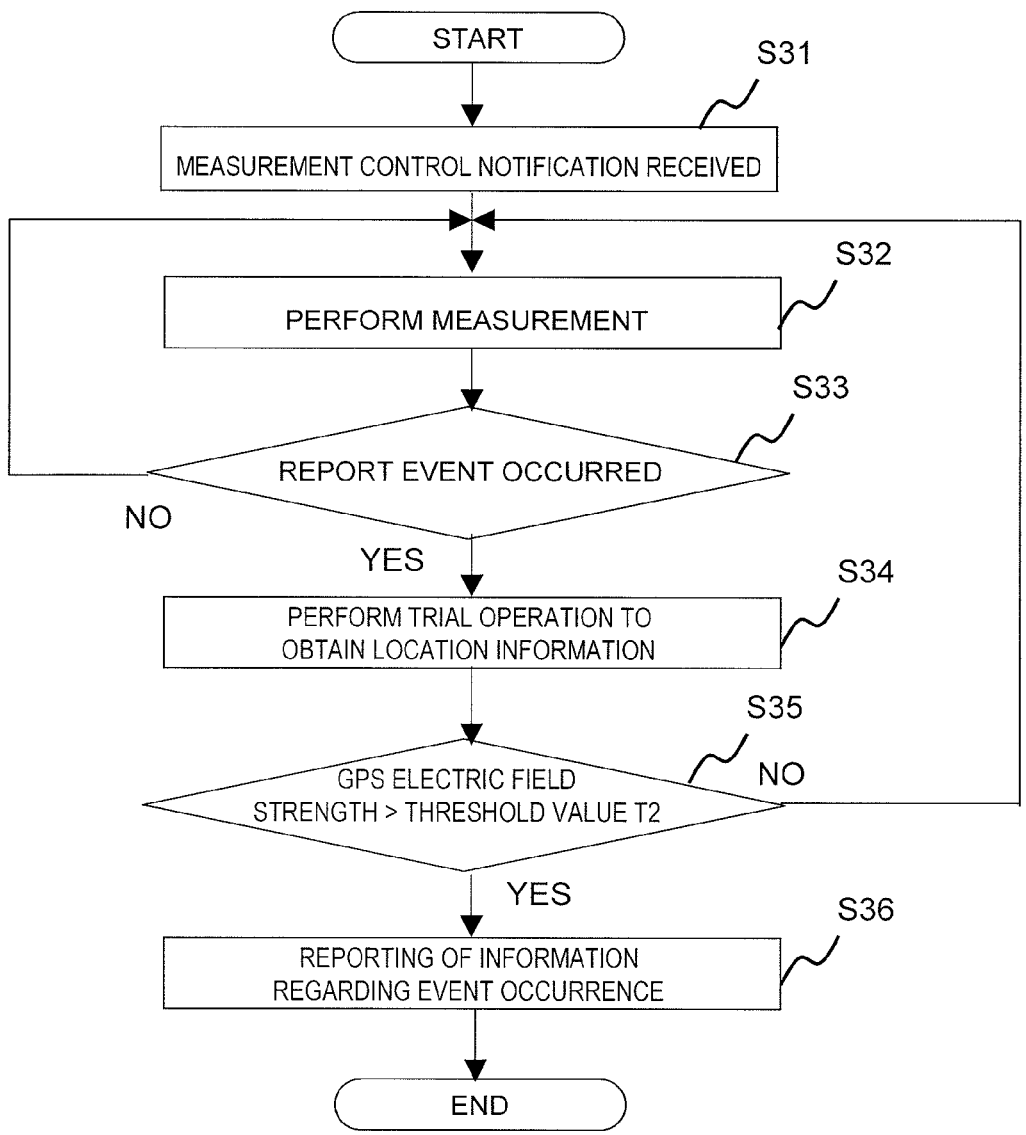
FIG. 9 is a flowchart illustrating the control of exemplary embodiment 4 of the present invention.

In a fourth exemplary embodiment of the present invention, a report is made in case the strength of the electric field of the GPS electric wave is greater than or equal to a preset value. FIG. 9 illustrates the operation of exemplary embodiment 4 of the present invention. The operation of the present exemplary embodiment will now be described with reference to FIGS. 4 and 9.

The mobile station receives a command for measurement (measurement control notification) from the base station (step S31). More specifically, the measurement control unit 37 of the mobile station inputs a measurement instruction from the base station as received via the radio transmission/reception unit 31 and the reception data processing unit 32.

The mobile station measures a link status, such as a reception level of a pilot signal from the base station (step S32). More specifically, the measurement control unit 37 of the mobile station measures e.g., the signal level of the pilot signal as received by the radio transmission/reception unit 31 and the reception data processing unit 32. The measurement result is stored in the measurement data storage unit 38.

On occurrence of a report event (YES of step S33), the trial operation of acquisition of the GPS location information and measurement of the electric field of the GPS electric wave is performed (step S34). More specifically, the measurement control unit 37 of the mobile station requests the GPS reception unit 36 to obtain the GPS location information. By the occurrence of a report event is meant the occurrence of an event that is to be a trigger for transmitting the report of the measurement result to the base station, as previously mentioned.

In case the strength of the electric field of the GPS electric wave is greater than the threshold value T2 (YES of step S35), it is determined that the mobile station is located outdoors. The mobile station accordingly reports the event occurrence information (step S36). More specifically, the measurement control unit 37 of the mobile station compares the strength of the GPS electric field from the GPS reception unit 36 with a threshold value. If the strength of the GPS electric field is greater than the threshold value, the measurement data report control unit 39 is instructed to prepare a measurement report. The measurement data report control unit 39 prepares the measurement report on the measurement data, GPS location information, time or event sorts, as stored in the measurement data storage unit 38. The measurement data report control unit wirelessly transmits the measurement report to the base station via the transmission data processing unit 33 and via the radio transmission/reception unit 31 over antenna 30-1.

In the first and second exemplary embodiments, described above, the above preset time may be notified by the base station to the mobile station. This preset time is pre-stored in the measurement instruction generation unit 25 of the management server 4, and is transmitted from the management server 4 to the mobile station via the base station. The mobile station retains the preset time, received by the radio transmission/reception unit 31 and the reception data processing unit 32, in the threshold value memory 37-1 as being the timeout time of the timer.

In the third and fourth exemplary embodiments, measurement and reporting are performed if the strength of the electric field of the GPS electric wave is greater than or equal to a preset threshold value, instead of performing the measurement and reporting if the GPS location information has been obtained with success within the preset time.

It is also possible to measure the strength of the electric field of the electric wave of the terrestrial digital TV broadcasting, in place of obtaining the GPS location information, to perform measurement and reporting in case the electric field strength is greater than or equal to a preset threshold value.

A fifth exemplary embodiment of the present invention will now be described. In the present exemplary embodiment, the time needed in obtaining the GPS location information is measurement in case of occurrence of a preset event. If the acquisition of the location information has not been completed within a preset time period, re-trial operations for acquisition are carried out at a preset period. If the mobile station is equipped with the function of detecting a movement, the re-trial operations may be performed each time the mobile station has moved a preset distance. The mobile station reports the time needed in obtaining the location information and the number of times of re-trial operations performed.

The management server (4 of FIG. 2) determines an event occurring at a site with short time of the GPS location information acquisition as being an outdoor event, and improves the communication quality at this site with particular emphasis.

If the re-trial operations are carried out too many times such that the location information is low in reliability, the weight of the data at the site may be decreased in optimizing the communication quality.

An upper limit may be set on the number of times of the re-trial operations for obtaining the GPS location information. If the number of times of the re-trial operations is set to zero, in case the accurate location information cannot be obtained, a report may be made with the exclusion of the location information, or the report on the occurrence of the event itself is not made.

Figure 10:
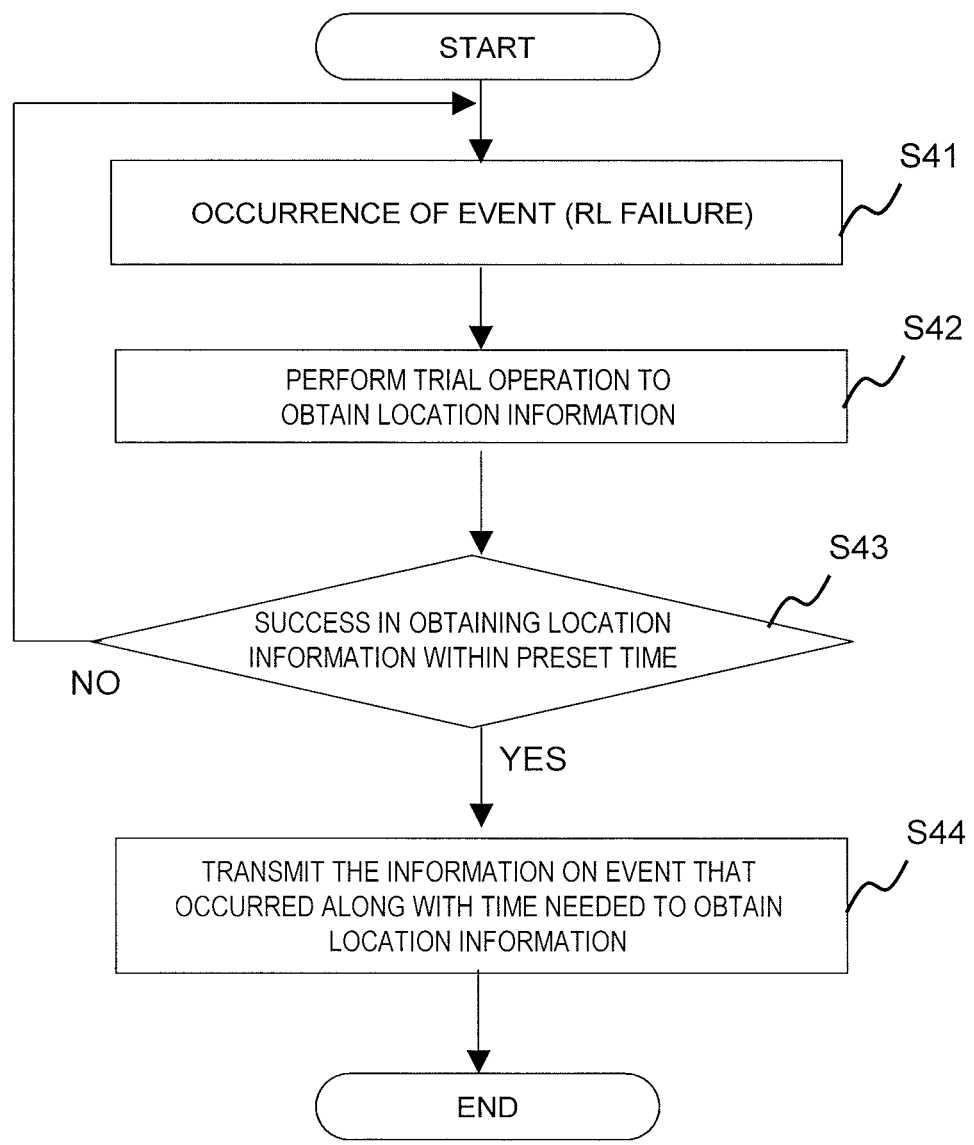
FIG. 10 is a flowchart illustrating the control of exemplary embodiment 5 of the present invention.

FIG. 10 illustrates the operation of exemplary embodiment 5 of the present invention. On occurrence of a preset event (step S41), a trial operation of obtaining the GPS location information is performed (step S42). The occurrence of an event, such as a radio link failure, is detected by the link connection control unit 35 of the mobile station, and notified to the measurement control unit 37. The measurement control unit 37 requests the GPS reception unit 36 to obtain the GPS location information. At this time point, the measurement control unit 37 starts the timer 37-2.

In case the acquisition of the GPS location information is not completed within the preset time (NO of step S43), re-trial operations are carried out at a constant period. In more detail, if the GPS location information from the GPS reception unit 36 is not received before timeout, the measurement control unit 37 transfers to a step S41.

If the mobile station is equipped with the function of detecting its movement, the step S42 may be carried out each time the mobile station has moved a preset distance.

In case the acquisition of the GPS location information is completed within the preset time (YES of step S43), the time needed in obtaining the GPS location information and the number of times of the re-trial operations performed are reported (step S44). In more detail, if the measurement control unit 37 of the mobile station has received the GPS location information from the GPS reception unit 36 before the occurrence of time-out, the measurement control unit 37 instructs the measurement data report control unit 39 to carry out the reporting. The measurement data report control unit 39 prepares a report including the time needed in obtaining the GPS location information and the number of times of the re-trial operations, and transmits the report via the transmission data processing unit 33, the radio transmission/reception unit 31 and antenna 30-1 to the base station.

The GPS location information may periodically be obtained from the time before event occurrence. However, in this case, the information on reliability, corresponding to the time that has elapsed from the time of acquisition of the GPS location information, is reported.

The case where the present invention is applied to SON (self organizing/optimizing networks), provided with a SON server, will now be described. In the following instance, a report on the monitored result in the above exemplary embodiment is termed as a 'SON measurement report' (see Non-Patent Document 1).

Figure 11:
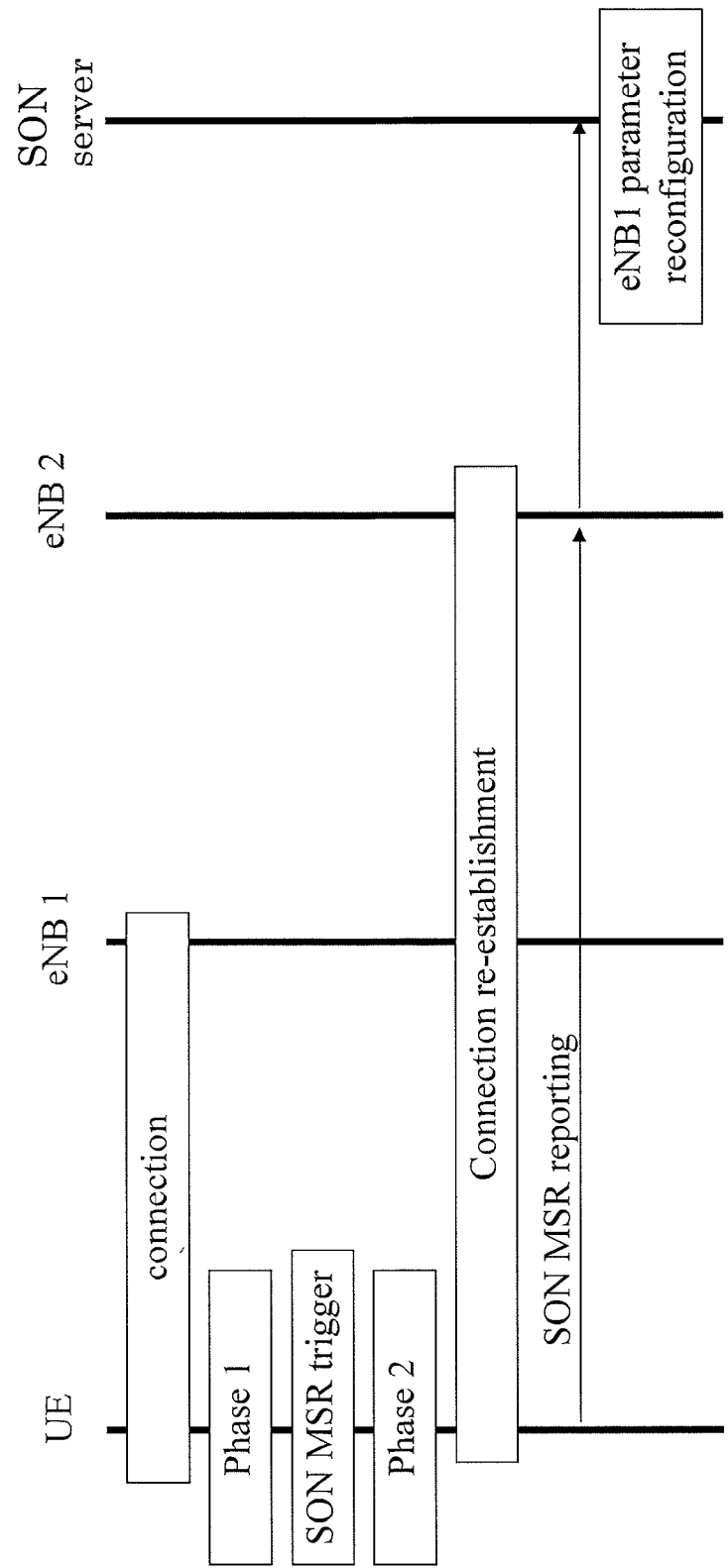
FIG. 11 is a diagram showing signaling flow of a SON measurement report.

Referring to FIG. 11, a mobile station (UE) is connected on radio link to a base station (eNB1). A radio link failure occurs and this becomes a trigger to the SON measurement report (SON Measurement (MSR) trigger). A phase 1 (Phase 1) represents a state where a cell has become invisible to the mobile station and a phase 2 (Phase 2) represents a time when the mobile station searches not the current cell but another cell after the end of the phase 1 (Phase 1). When the connection to a base station (eNB2) is re-established (connection re-establishment), the SON measurement report is transmitted to the base station (eNB2) and then to the management server (SON server). This management server (SON server) re-configures one or more radio parameters of the base station (eNB1) (eNB1 parameter reconfiguration).

In order to improve the effectiveness of a self organized mechanism in the network, a large sample of SON measurement reports are needed. For example, in order to control the common pilot powers of multiple cells in a neighboring region, thousands of UE measurement reporting with different location distribution would be more helpful than a few number of UE measurement reporting within a limited location distribution. In order to collect a large sample of SON measurement reports, the network should be able to request as many as UE possible in order to minimize the chance of unbalanced loading from the view point of UE, i.e. a group of UE is requested for more SON reporting than other UE. In an ideal case, entire UEs in the network should be requested with equal probability for SON reporting which then maximize the reliabilities of collected samples for self organized mechanism.

When considering UEs in the network, most of them have different communication environments such that some UE would be located outdoors while the others are located inside a building, tunnel or subways. Collecting a large number of SON reporting would improve the reliability of the collected samples but these samples should share a similar characteristics such as outdoor/indoor characteristics. If SON measurements from both outdoor/indoor are mixed, it may not be a good input material for self organized mechanism. For example, if there are 50%/50% of outdoor/indoor UE in cell 1 and 10%/90% in a cell 2, then cell 2 would have more SON reporting of a radio link failure, a handover failure or low user throughputs because there are more indoor UE than cell 1. However it does not implies that cell 2 is less optimized for cell 1, because what would be important information is the SON measurement from outdoor UE from each cell.

The present invention thus proposes the following.

A UE's surrounding environment indicator is defined on the basis of

GPS reception quality, time of acquisition of the GPS location information, and/or the reception quality of digital, analog TV/radio broadcasting.

The network controls the SON measurement and reporting based on the UE's surrounding environments.

The SON measurement or reporting is allowed for a UE's surrounding environment, while no SON measurement or reporting is allowed for another UE's surrounding environment.

The UE may report an environment indicator as a part of the SON measurement report.

In the following, the case of using the GPS reception quality as the key environment indicator is explained.

If the serving cell quality and the GPS reception quality are taken into consideration, the classification into the following four cases may be made. FIGS. 12A to 12D illustrates the measurement result of these four cases.

Case 1:

The serving cell quality (Q1) is above a predetermined threshold value T1, and the GPS reception quality (Q2) is above a threshold value T2.

Case 2:

The serving cell quality (Q1) is less than or equal to the threshold value T1, and the GPS reception quality (Q2) is above the threshold value T2.

Case 3:

The serving cell quality (Q1) is above the threshold value T1, and the GPS reception quality (Q2) is less than or equal to the threshold value T2.

Case 4:

The serving cell quality (Q1) is less than or equal to the threshold value T1, and the GPS quality (Q2) is less than or equal to the threshold value T2.

In the case 1, the UE is located in outdoor, and the network provides a good reception quality.

In the case 2, the UE is located in outdoor. However, the signal strength is poor so that this outdoor UE may suffer an inferior user throughput or a connection failure during a call. To minimize the occurrence of the case 2, the network operator is obliged to reconfigure surrounding cells or install a new base station around the problematic location, thereby improving the quality.

The cases 3 and 4 represent those cases where the UE is located in indoor, for example, inside a building, a tunnel or a subway. The locations where the GPS signal cannot be received or the GPS signal strength is low may be categorized to the case 3, i.e. a good network coverage, with the serving cell quality (Q1) being above the threshold value T1, or to the case 4, i.e. a bad network coverage with the serving cell quality (Q1) being less than or equal to the threshold value T1.

If a network coverage is well deployed in a subway area, UE can only detect a good serving cell quality while UE cannot estimate its location based on GPS signal.

A network operator would be interested in collecting the distribution of user experience such as the serving cell quality level. For indoor UE, due to the penetration loss of building, it is usual that UE cannot receive the serving cell signal with a good quality level. Then the network operator would be interested in collecting the serving cell quality experienced only by outdoor UE to which the network should provide a reasonable the serving cell quality as much as possible.

Figure 13:
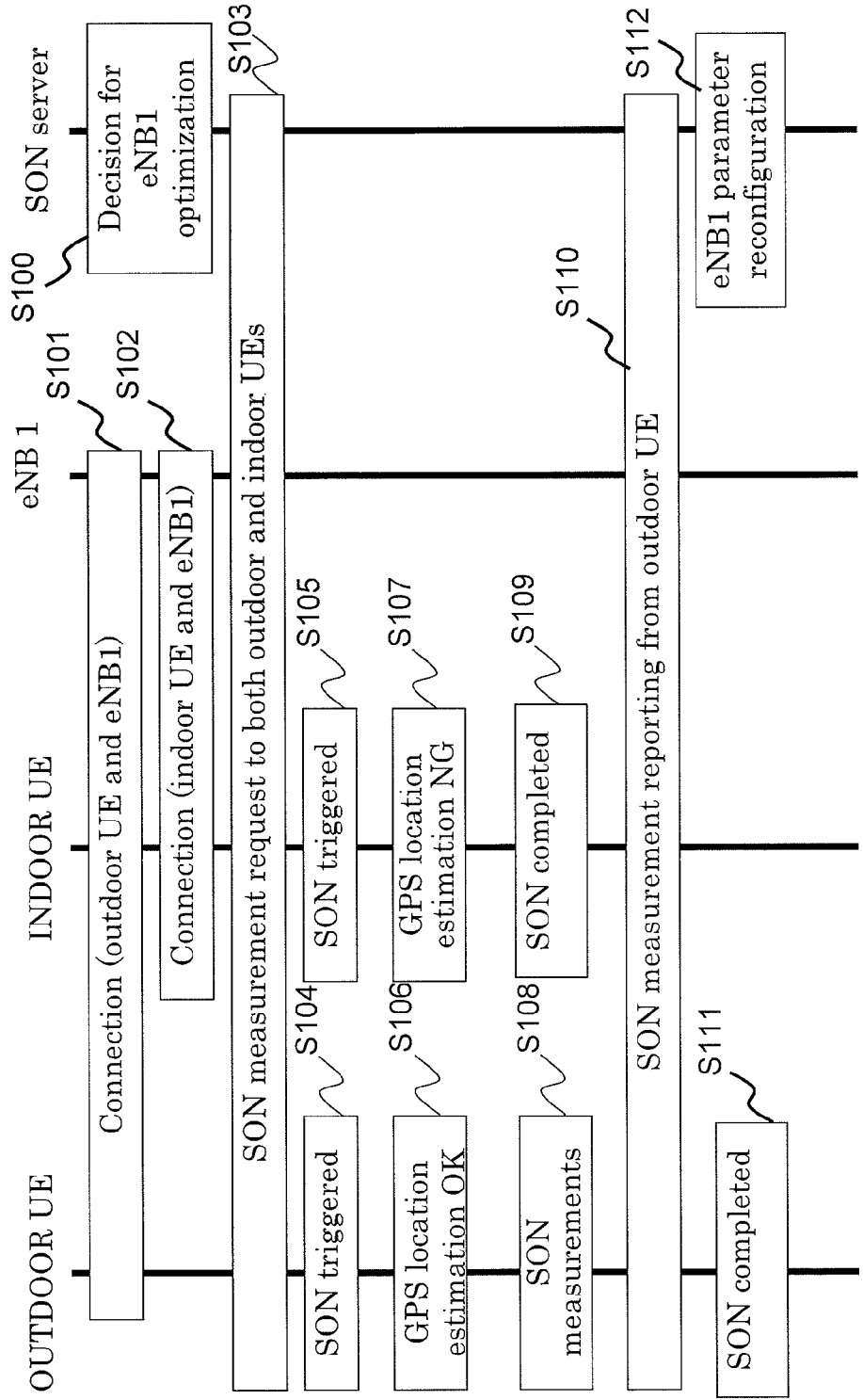
FIG. 13 is a diagram showing the sequence of GPS location acquisition and SON measurement of an indoor UE and an outdoor UE.

FIG. 13 is a sequence diagram illustrating one example for the case of SON server request based SON measurement and reporting.

It is assumed that an outdoor UE and an indoor UE are connected to eNB1 (S101, S102). The Outdoor UE is able to receive the GPS signal with a good reception quality while indoor UE cannot receive the GPS signal.

A SON server determines performing optimization of the radio parameter of eNB1 (S100), and requests the UE connected to the eNB1 to start (trigger) SON measurement (S103).

Both outdoor and indoor UE are triggered for SON measurement by a request from eNB1 (S104, S105).

Outdoor UE can receive GPS signal with a good reception quality and therefore succeeded to obtain GPS location information (S106).

The indoor UE had a poor GPS signal quality and failed to obtain the location information (S107).

The indoor UE discontinues the procedure and returns to a normal operation (S109).

The outdoor UE continues the remaining procedure of SON measurements (S108) and reporting to eNB1 (S110) and completes SON measurement and returns to a normal operation (S111).

Based on the report on the result of SON measurement from the outdoor UE, the SON server reconfigures the cell parameters to optimize the cell in question (re-sets the parameters of the eNB1) (S112).

In an example shown in FIG. 13, SON measurement and reporting by the indoor UE are prohibited. This prohibition allows the indoor UE to avoid unnecessary SON related measurements and its reporting so that it could save its precious resource such as the battery life.

The eNB1 does not have to handle the SON measurement report from indoor UE and the SON server can avoid the SON reporting from indoor UE which will be discarded anyway. This suppresses the increase of the network traffic and load.

The present invention can be slightly modified causing a collection of more focused SON measurements for indoor users. Usually the indoor UE suffers the lower throughput compared to outdoor users. The network operator then would be interested in finding out the user experiences while users are located in indoor environment.

Figure 14:
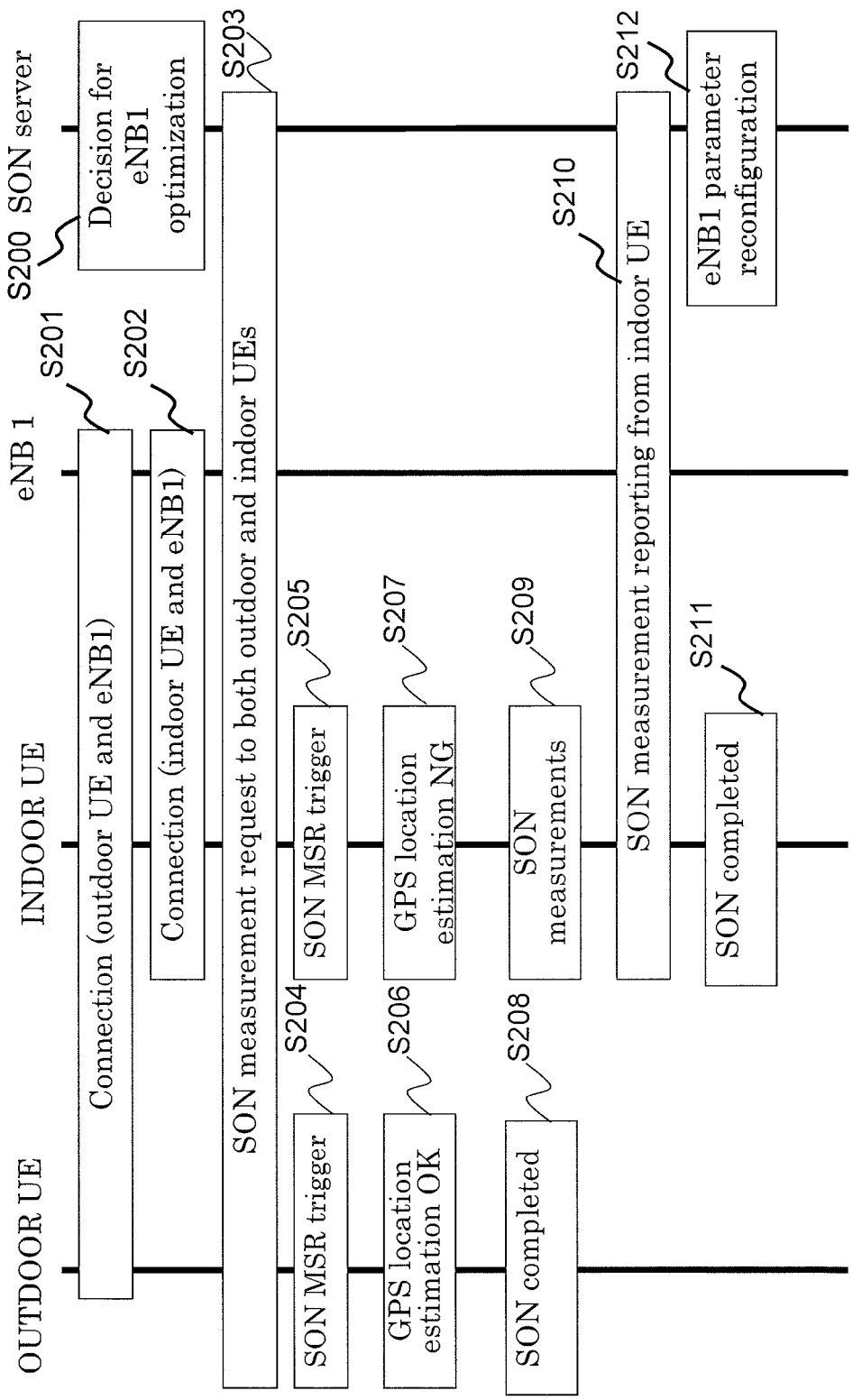
FIG. 14 is a diagram showing the sequence of GPS location acquisition and SON measurement of an indoor UE and an outdoor UE.

FIG. 14 illustrates another example of SON server request based SON measurement and reporting based on a SON server request.

The outdoor UE and the indoor UE are connected to eNB1. The outdoor UE is able to receive a GPS signal with good reception quality, while the indoor UE cannot receive the GPS signal.

The SON server determines performing optimization of the radio parameter of eNB1n (S200), and the SON server requests eNB1 to trigger the SON measurement to UE connected to eNB1 (S203).

Both outdoor and indoor UEs are triggered for SON measurement by a request from eNB1 (S204, S205).

The outdoor UE is able to receive the GPS signal with a good reception quality and hence succeeds in obtaining the GPS location information (S206).

The indoor UE has a poor GPS signal quality and fails to obtain the GPS location. (S207).

The outdoor UE completes the procedure of SON measurement and returns to a normal operation (S208). The indoor UE continues the remaining procedure of SON measurement (S209 and reports the SON measurement result to eNB1 (S210). The indoor UE completes the procedure of SON measurement and returns to a normal operation (S211).

Based on received reporting from the indoor UE, the SON server can obtain the service quality of the indoor UE such as average user throughput distribution of indoor (amount of effective data transmission that may be made without error per unit time), and re-configures parameters of the eNB1 (S212).

In an example shown in FIG. 14, the outdoor UE is prohibited to perform SON related measurements and its reporting because the purpose of this measurement is only to focus on the indoor UE. This prohibition allows the outdoor UE to avoid unnecessary SON related measurements and its reporting so that it could save its precious resource such as the battery life.

The solution proposed by the present invention also benefits the network because eNB1 does not have to handle the SON report from outdoor UE and the SON server can avoid the SON reporting from outdoor UE which will be discarded anyway.

Figure 15:
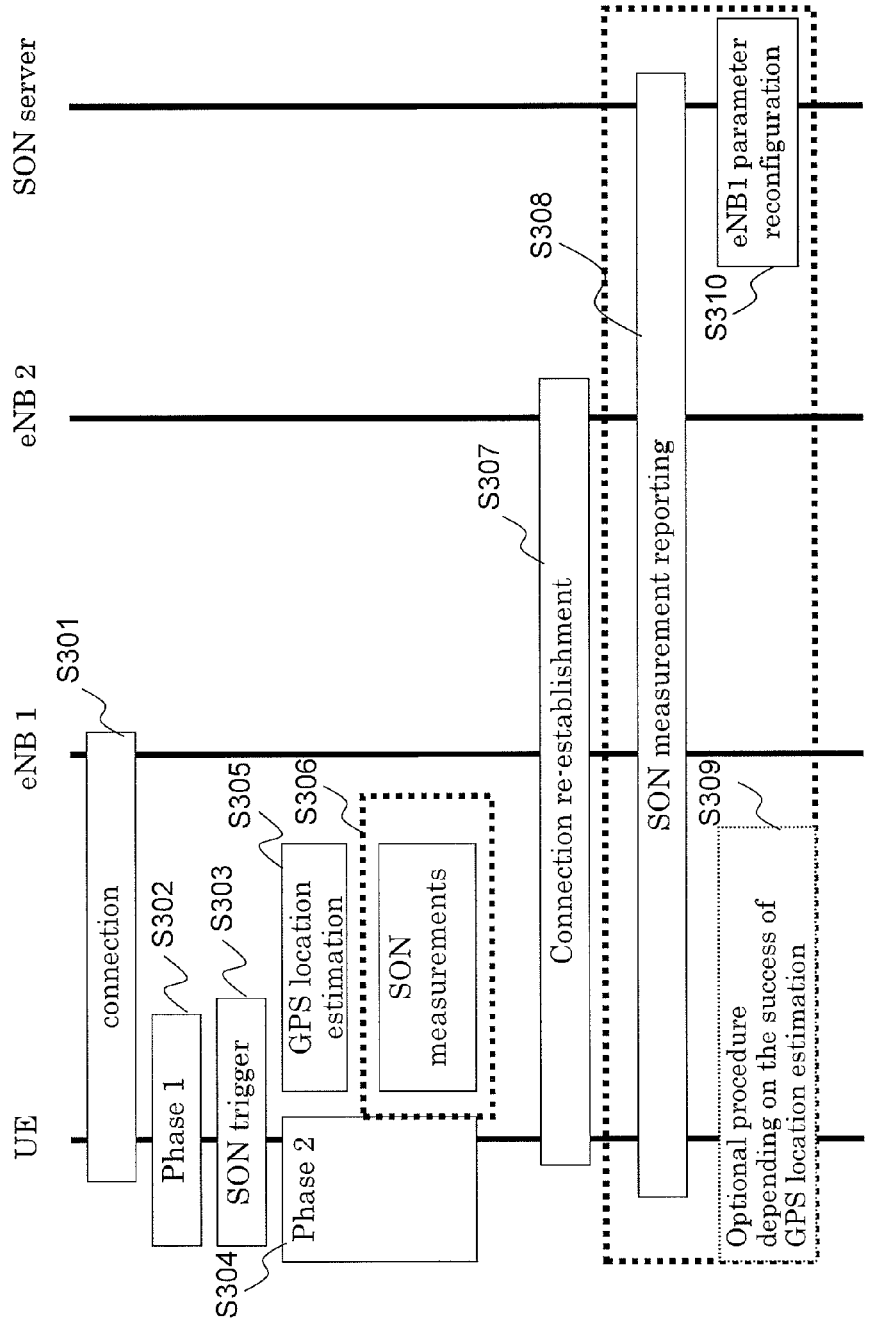
FIG. 15 illustrates SON measurement in case of hand-over.

The above examples are focused on the server request based SON measurement and reporting scenarios. The solution proposed by the present invention can be also applied to other SON measurement and reporting scenario such as a radio link failure case. This will now be described with reference to FIG. 15.

A UE is connected to an eNB1, and an active call session is established (S301).

A phase 1 is a kind of a waiting procedure during which the UE keeps monitoring the serving cell quality (S302).

If the serving cell quality has been improved within a pre-defined time period, the UE returns to a normal operation mode. Otherwise, the UE gives up trying to connect the serving cell and initiates the Phase 2 that is trying to search the new cell UE can connect to.

The UE fails to reconnect to the serving cell which then triggers the SON measurement of the radio link failure (S303). At the same time, the UE starts the Phase 2 of radio link failure recovery procedure, i.e. UE based cell search (S304).

The UE performs the GPS location estimation in order to obtain the location information for SON reporting (S305).

If the UE succeeds in the GPS location estimation due to good GPS signal reception, i.e. outdoor UE, then the UE can continue the SON measurement such as neighbor cell measurements (S306). If the GPS signal is low in quality such that estimation of the GPS location has failed (indoor UE), the UE skips SON measurement.

The UE finds a new cell controlled by eNB2 and re-establishes the connection (S307).

If the UE has succeeded in the GPS location estimation, then UE sends the measured SON report to the SON server (S308). At this time, the time to estimate the GPS location can be transmitted together with other SON measurements (S309). The eNB1 parameter reconfiguration by the SON server is performed (S310).

In other cases, this reporting procedure of the SON measurement is omitted. This solution proposed by the present invention allows the UE with a bad GPS reception quality to skip the SON related measurements and reporting procedure. This would be useful when a network operator wishes not to collect the radio link failure related SON measurement report for the case of indoor users.

When the user is located inside a building, elevator or subway, both network signal and GPS signal cannot reach and it is natural to have a radio link failure in those scenarios. In other words, even UE reports the SON measurements for those failure cases, there is a little way for the network operator to optimize the network in order to improve such failure cases. The solution proposed by the present invention allows the indoor UE to avoid unnecessary SON related measurements and its reporting so that it could save its precious resource such as the battery life.

Also the solution proposed by the present invention also benefits the network because the eNB2 does not have to handle the SON report from an indoor UE and the SON server can avoid the SON reporting from the indoor UE which will be discarded anyway.

Figure 16:
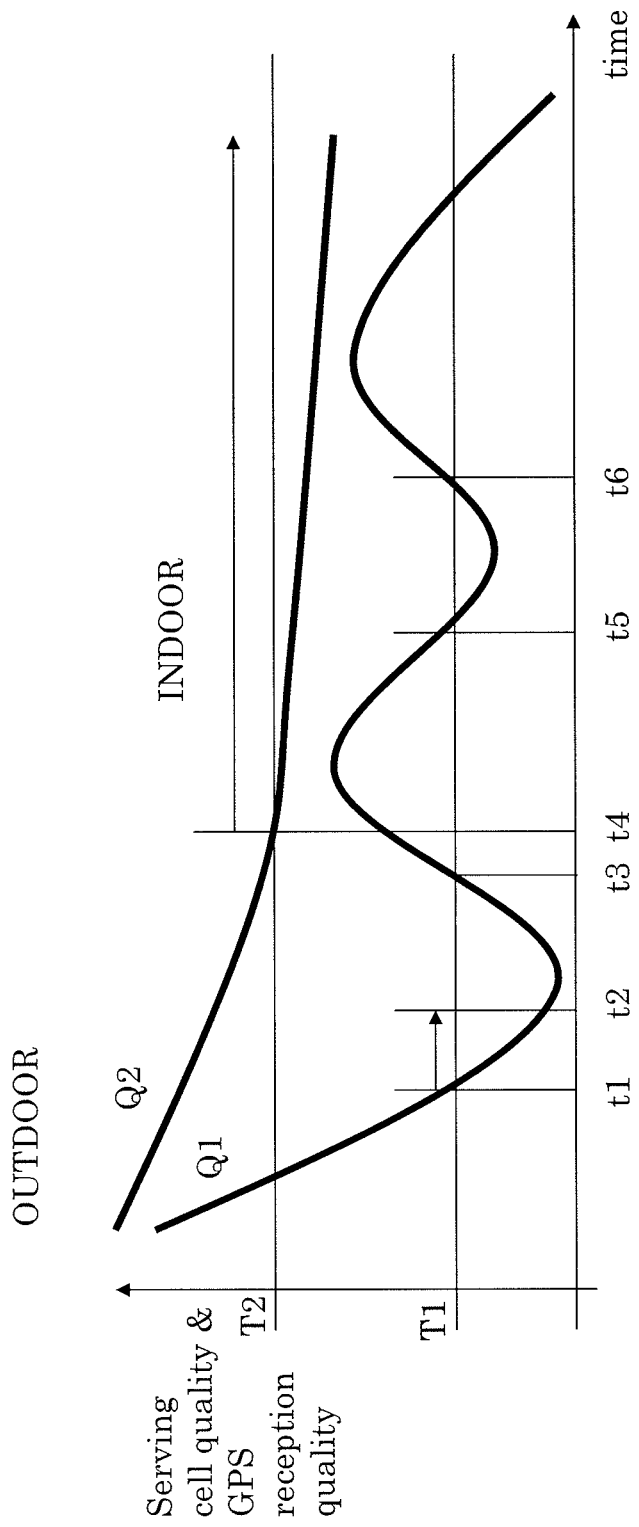
FIG. 16 shows an example transition of the serving cell quality Q1 and the electric field strength of the GPS electric wave for indoors and for outdoors.

FIG. 16 shows an example of time transition of serving cell quality Q1 and GPS reception quality Q2 (see FIG. 12). It is noted that each vertical axis for Q1 and Q2 is arranged into one axis for convenience, and are not to the same scale. Before time t1, Q1>T1 and Q2>T2, whereas, as from time t1, Q1<T1. At time t4, Q2<T2, such that the UE is determined to be located indoors. However, Q1>T1, such that it may not be said that the serving cell quality is inferior. Between time t5 and t6, Q1<T1. The state before time t1 is the case of FIG. 12A, that for t1-t3 is the case of FIG. 12B, that for t4-t5 is the case of FIG. 12C and that for t5-t6 is the case of FIG. 12D.

The above described exemplary embodiments of the present invention are summarized, though not limited thereto only, as following supplementary notes.

[1] A mobile terminal of an exemplary embodiment of the present invention controls, in accordance with a reception status of a radio signal from a preset radio transmission source other than a base station, the execution of measurement on a link status by the mobile terminal and/or the execution of reporting of the measurement result on the link status to a base station.

[2] In the mobile terminal according to the exemplary embodiment of [1], the radio signal from the preset radio transmission source includes a signal that renders it possible to determine whether the mobile terminal is located indoors or outdoors based on the reception status of the radio signal.

[3] In the mobile terminal according to the exemplary embodiment [1] or [2], the reception status of a radio signal from the preset radio transmission source includes at least one out of:

a time needed in receiving the radio signal and obtaining preset information from the signal; and a reception quality or strength of the radio signal.

[4] In the mobile terminal according to the exemplary embodiment [1] or [2], the mobile terminal transmits the report in which the measurement result of the link status and information regarding the reception status of the radio signal from the preset radio transmission source are included, to the base station.

[5] In the mobile terminal according to any one of exemplary embodiments of execution [1] to [4], an antenna of the preset radio transmission source is provided at a location higher than an antenna of the base station.

[6] In the mobile terminal according to any one of exemplary embodiments of execution [1] to [5], a frequency used in the preset radio transmission source is lower than a frequency of a signal from the base station.

[7] In the mobile terminal according to any one of exemplary embodiments of execution [1] to [6], the preset radio transmission source includes one or more out of a GPS (Global Positioning System) satellite, terrestrial digital television broadcasting, analog television broadcasting and radio broadcasting.

[8] In the mobile terminal according to any one of exemplary embodiments of execution [1] to [7], the mobile terminal obtains the location information of the mobile terminal on occurrence of a preset event, and wherein, in case the location information is obtained within a preset time period, the mobile terminal transmits the time needed in obtaining the location information and the information on the event that occurs as the report to the base station.

[9] In the mobile terminal according to any one of exemplary embodiments of execution [1] to [7], in case a measurement instruction from the base station indicates that control is to be performed based on whether or not the location information can be obtained, the mobile terminal performs a trial operation of obtaining the location information of the mobile terminal, and the mobile terminal controls the measurement on the link status, depending on whether or not the location information is obtained within a preset time period.

[10] In the mobile terminal according to the exemplary embodiment [9], the mobile terminal makes a report on the measurement result of the link status to the base station, in response to occurrence of a preset event.

[11] In the mobile terminal according to any one of exemplary embodiments of execution [1] to [7], the mobile terminal executes measurement on the link status, in accordance with a measurement instruction from the base station, performs a trial operation of obtaining the location information of the terminal, responsive to an occurrence of a preset event, and makes a report on the information of the event to the base station, depending on whether or not the location information is obtained within a preset time period.

[12] In the mobile terminal according to any one of exemplary embodiments of execution [1] to [7], the mobile terminal performs a trial operation of obtaining the location information of the terminal in case a measurement instruction from the base station indicates that control, based on whether or not the location information can be obtained is to be exercised, and controls the execution of the measurement on the link status, depending on whether the reception quality of the location information is higher or lower than a preset threshold value.

[13] In the mobile terminal according to the exemplary embodiment [12], the mobile terminal makes a report on the measurement result of the link status to the base station in response to occurrence of a preset report event.

[14] In the mobile terminal according to the exemplary embodiment [9] or [12], the information on whether or not control based on whether or not the location information can be obtained is to be made is set on the side of a management server that performs adjustment of a radio parameter regarding the base station, the information being notified from the management server to the base station, the base station transmitting the information as the measurement instruction.

[15] In the mobile terminal according to any one of exemplary embodiments of execution [1] to [7], the mobile terminal performs the measurement on the link status in accordance with the measurement instruction from the base station, performs a trial operation of obtaining the location information of the terminal in response to occurrence of a preset event, and controls reporting to the base station of the information of the event that has occurred, depending on whether the reception quality of the location information is higher or lower than a preset threshold value.

[16] In the mobile terminal according to any one of exemplary embodiments of execution [1] to [7], the mobile terminal performs a trial operation of obtaining the location information of the mobile terminal on occurrence of a preset event, and controls reporting to the base station of the information of the event that has occurred, depending on whether or not the location information is obtained within the preset time.

[17] In the present exemplary embodiment, the mobile terminal uses, as surrounding environment information thereof, a reception quality of GPS (Global Positioning System) wave received by the mobile terminal or time needed to obtain the GPS location information and/or the reception quality of preset television broadcasting or radio broadcasting, and controls, based on the surrounding environment information, the execution of measurement on a link status performed by the mobile terminal and/or reporting of the measurement on the link status to the base station.

[18] In the mobile terminal according to the exemplary embodiment [17], the mobile terminal performs a control such that the measurement on the link status and reporting of the measurement on the link status to the base station is allowed for one surrounding environment, and the measurement on the link status and reporting of the measurement on the link status to the base station is not allowed for another surrounding environment.

[19] In the mobile terminal according to the exemplary embodiment [17] or [18], the mobile terminal transmits information on the surrounding environment to the base station as being a part of the report of the measurement result of the link status.

[20] In the mobile terminal according to the exemplary embodiment [17], the mobile terminal performs a trial operation of obtaining the GPS location information on receipt of a command for measurement on the link status from the base station, and performs the measurement of the link state in case estimation of the GPS location information has met success, and reports the measurement result of the link status to the base station.

[21] In the mobile terminal according to the exemplary embodiment [17], the mobile terminal performs a trial operation of obtaining the GPS location information on receipt from the base station of an instruction for measurement on the link status, and performs the measurement on the link status in case the estimation of the GPS location information has failed and reports the measurement result of the link status to the base station.

[22] In the mobile terminal according to the exemplary embodiment [17], the mobile terminal performs a cell search in case of a failure of a radio link of a serving cell that is currently offering a service, and performs a trial operation for obtaining the GPS location information, performs measurement on link statuses of neighboring cells in case the GPS location information has been obtained with success, and reports the measurement result on the link status, on re-connection to another cell, to a base station of the other cell.

[23] In the mobile terminal according to the exemplary embodiment [22], the mobile terminal transmits the time needed in obtaining the GPS location information, along with the report, to the base station.

[24] A radio communication system according to the present exemplary embodiment includes a base station and a mobile terminal, wherein the mobile terminal controls, in accordance with a reception status of a radio signal from a preset radio transmission source other than a base station, the execution of measurement on a link status by the mobile terminal and/or the execution of reporting of the measurement result on the link status to a base station.

[25] In the radio communication system according to the exemplary embodiment [24], the radio signal from the preset radio transmission source includes a signal that renders it possible to determine whether the mobile terminal is located indoors or outdoors based on the reception status of the radio signal.

[26] In the radio communication system according to the exemplary embodiment [24] or [25], the reception status of a radio signal from the preset radio transmission source includes at least one out of:

a time needed in receiving the radio signal and obtaining preset information from the signal; and a reception quality or strength of the radio signal.

[27] A radio communication system according to the present exemplary embodiment includes a base station and a mobile terminal, wherein the mobile terminal uses, as surrounding environment information thereof, a reception quality of GPS (Global Positioning System) wave received by the mobile terminal or time needed to obtain the GPS location information and/or the reception quality of preset television broadcasting or radio broadcasting, and wherein the mobile terminal controls, based on the surrounding environment information, the execution of measurement on a link status performed by the mobile terminal and/or reporting of the measurement on the link status to the base station.

[28] In the radio communication system according to the exemplary embodiment [27], the mobile terminal performs a control such that the measurement on the link status and reporting to the base station of the measurement on the link status is allowed for one surrounding environment, and the measurement on the link status and reporting to the base station of the measurement on the link status is not allowed for another surrounding environment.

[29] In the radio communication system according to the exemplary embodiment [27] or [28], the mobile terminal transmits information on the surrounding environment to the base station as being a part of the report of the measurement result of the link status.

[30] In the radio communication system according to the exemplary embodiment [27], the mobile terminal performs a trial operation of obtaining the GPS location information on receipt of a command for measurement on the link status from the base station, and the mobile terminal performs the measurement of the link state in case estimation of the GPS location information has met success, and reports the measurement result of the link status to the base station.

[31] In the radio communication system according to the exemplary embodiment [27], the mobile terminal performs a trial operation of obtaining the GPS location information on receipt from the base station of an instruction for measurement on the link status, and the mobile terminal performs the measurement on the link status in case the estimation of the GPS location information has failed and reports the measurement result of the link status to the base station.

[32] In the radio communication system according to the exemplary embodiment [27], the mobile terminal performs a cell search in case of a failure of a radio link of a serving cell that is currently offering a service, and performs a trial operation for obtaining the GPS location information, the mobile terminal performs measurement on link statuses of neighboring cells in case the GPS location information has been obtained with success, and the mobile terminal reports the measurement result on the link status, on re-connection to another cell, to a base station of the other cell.

[33] In the radio communication system according to the exemplary embodiment [32], the mobile terminal transmits the time needed in obtaining the GPS location information, along with the report, to the base station.

[34] According to the present exemplary embodiment, a radio communication method comprises:

a mobile terminal controlling, in accordance with a reception status of a radio signal from a preset radio transmission source other than a base station, the execution of measurement on a link status by the mobile terminal and/or the execution of reporting of the measurement result on the link status to a base station.

[35] In the radio communication method according to the exemplary embodiment [34], the radio signal from the preset radio transmission source includes a signal that renders it possible to determine whether the mobile terminal is located indoors or outdoors based on the reception status of the radio signal.

[36] In the radio communication method according to the exemplary embodiment [34] or [35], the reception status of a radio signal from the preset radio transmission source includes at least one out of:

a time needed in receiving the radio signal and obtaining preset information from the signal; and a reception quality or strength of the radio signal.

[37] In the radio communication method according to any one of exemplary embodiments of execution [34] to [36], the mobile terminal transmits the report in which the measurement result of the link status and information regarding the reception status of the radio signal from the preset radio transmission source are included, to the base station.

[38] In the radio communication method according to any one of exemplary embodiments of executions [34] to [37], the preset radio transmission source includes one or more out of a GPS (Global Positioning System) satellite, terrestrial digital television broadcasting, analog television broadcasting and radio broadcasting.

[39] In the radio communication method according to any one of exemplary embodiments of execution [34] to [38], the mobile terminal obtains the location information of the mobile terminal on occurrence of a preset event, and wherein, in case the location information is obtained within a preset time period, the mobile terminal transmits the time needed in obtaining the location information and the information on the event that occurs as the report to the base station.

[40] In the radio communication method according to any one of exemplary embodiments of execution [34] to [38], in case a measurement instruction from the base station indicates that control is to be performed based on whether or not the location information can be obtained, the mobile terminal performs a trial operation of obtaining the location information of the mobile terminal, and the mobile terminal controls the measurement on the link status, depending on whether or not the location information is obtained within a preset time period.

[41] In the radio communication method according to the exemplary embodiment [40], the mobile terminal makes a report on the measurement result of the link status to the base station, in response to occurrence of a preset event.

[42] In the radio communication method according to any one of exemplary embodiments of execution [34] to [38], the mobile terminal executes measurement on the link status, in accordance with a measurement instruction from the base station, the mobile terminal performs a trial operation of obtaining the location information of the terminal, responsive to an occurrence of a preset event, and the mobile terminal makes a report on the information of the event to the base station, depending on whether or not the location information is obtained within a preset time period.

[43] In the radio communication method according to any one of exemplary embodiments of executions [34] to [38], the mobile terminal performs a trial operation of obtaining the location information of the terminal in case a measurement instruction from the base station indicates that control, based on whether or not the location information can be obtained is to be exercised, and the mobile terminal controls the execution of the measurement on the link status, depending on whether the reception quality of the location information is higher or lower than a preset threshold value.

[44] In the radio communication method according to the exemplary embodiment [43], the mobile terminal makes a report on the measurement result of the link status to the base station in response to occurrence of a preset report event.

[45] In the radio communication method according to any one of exemplary embodiments of execution [34] to [38], the mobile terminal performs the measurement on the link status in accordance with the measurement instruction from the base station, the mobile terminal performs a trial operation of obtaining the location information of the terminal in response to occurrence of a preset event, and the mobile terminal controls reporting to the base station of the information of the event that has occurred, depending on whether the reception quality of the location information is higher or lower than a preset threshold value.

[46] In the radio communication method according to any one of exemplary embodiments of executions [34] to [38], the mobile terminal performs a trial operation of obtaining the location information of the mobile terminal on occurrence of a preset event, and the mobile terminal controls reporting to the base station of the information of the event that has occurred, depending on whether or not the location information is obtained within the preset time.

[47] According to the present exemplary embodiment, In a radio communication method comprises:

a mobile terminal using, as surrounding environment information thereof, a reception quality of GPS (Global Positioning System) wave received by the mobile terminal or time needed to obtain the GPS location information and/or the reception quality of preset television broadcasting or radio broadcasting; and the mobile terminal controlling, based on the surrounding environment information, the execution of measurement on a link status performed by the mobile terminal and/or reporting of the measurement on the link status to the base station.

[48] In the radio communication method according to the exemplary embodiment [47], the mobile terminal performs a control such that the measurement on the link status and reporting of the measurement on the link status to the base station is allowed for one surrounding environment, and the measurement on the link status and reporting of the measurement on the link status to the base station is not allowed for another surrounding environment.

[49] In the radio communication method according to the exemplary embodiment [47], the mobile terminal transmits information on the surrounding environment to the base station as being a part of the report of the measurement result of the link status.

[50] In the radio communication method according to the exemplary embodiment [47], the mobile terminal performs a trial operation of obtaining the GPS location information on receipt of a command for measurement on the link status from the base station, and the mobile terminal performs the measurement of the link state in case estimation of the GPS location information has met success, and reports the measurement result of the link status to the base station.

[51] In the radio communication method according to the exemplary embodiment [47], the mobile terminal performs a trial operation of obtaining the GPS location information on receipt from the base station of an instruction for measurement on the link status, and performs the measurement on the link status in case the estimation of the GPS location information has failed and reports the measurement result of the link status to the base station.

[52] In the radio communication method according to the exemplary embodiment [47], the mobile terminal performs a cell search in case of a failure of a radio link of a serving cell that is currently offering a service, and performs a trial operation for obtaining the GPS location information, the mobile terminal performs measurement on link statuses of neighboring cells in case the GPS location information has been obtained with success, and the mobile terminal reports the measurement result on the link status, on re-connection to another cell, to a base station of the other cell.

[53] In the radio communication method according to the exemplary embodiment [52] the mobile terminal transmits the time needed in obtaining the GPS location information, along with the report, to the base station.

[54] A program according to the present exemplary embodiment causing a computer forming a mobile terminal, to execute the processing comprising:

controlling, in accordance with a reception status of a radio signal from a preset radio transmission source other than a base station, the execution of measurement on a link status by the mobile terminal and/or the execution of reporting of the measurement result on the link status to a base station.

[55] A program according to the present exemplary embodiment, causing a computer forming a mobile terminal, to execute the processing comprising:

the mobile terminal using, as surrounding environment information thereof, a reception quality of GPS (Global Positioning System) wave received by the mobile terminal or time needed to obtain the GPS location information and/or the reception quality of preset television broadcasting or radio broadcasting, and wherein the mobile terminal controlling, based on the surrounding environment information, the execution of measurement on a link status performed by the mobile terminal and/or reporting of the measurement on the link status to the base station.

[56] In the program according to the exemplary embodiment [55], the program causes the computer to execute the processing of transmitting the surrounding environment information to the base station as being a part of the report on the result of the measurement.

[57] In the program according to the exemplary embodiment [55], the program causes the computer to execute the processing comprising:

performing a trial operation of obtaining the GPS location information on receipt of a measurement instruction from the base terminal;

performing measurement on the link status in case estimation of the GPS location information has met success; and reporting the measurement result of the link status.

[58] In the program according to the exemplary embodiment [55], the program causes the computer to execute the processing comprising:

performing a trial operation of obtaining the GPS location information on receipt of a measurement instruction from the base station;

performing measurement on the link status in case estimation of the GPS location information has failed; and reporting the measurement result of the link status.

[59] In the program according to the exemplary embodiment [55], the program causes the computer to execute the processing comprising:

performing a cell search in case of a failure of the radio link of a serving cell currently offering a service and performing a trial operation for obtaining the GPS location information;

performing a trial operation of obtaining the GPS location information;

performing measurement on the link statuses of neighboring cells in case the GPS location information has been obtained with success; and reporting the measurement result of the link status, on re-connection to another cell, to a base station of the other cell.

[60] A base station according to the exemplary embodiment of the present invention, instructs a mobile terminal to use a reception quality of GPS (Global Positioning System) wave received by the mobile terminal or time needed to obtain the GPS location information and/or a reception quality of preset television broadcasting or radio broadcasting as surrounding environment information for the mobile terminal, the base station instructs the mobile terminal to control, based on the surrounding environment information, the execution of the measurement on the link status of the mobile terminal and/or the execution of reporting of the measurement on the link status to the base station.

[61] A management server according to the exemplary embodiment of the present invention, issues a measurement instruction via a base station to a mobile terminal to control, in accordance with a reception status of a radio signal from a radio transmission source other than the base station, the execution of measurement on a link status and/or the execution of reporting of the measurement result on the link status, the radio signal enabling determining whether the mobile terminal is located indoors or outdoors, based on a reception status thereof at the mobile terminal, and receives a report on the measurement result from the mobile terminal via the base station to distinguish between the mobile station being located indoors and the mobile station being located outdoors, based on a report of the measurement result to optimize one or more radio parameters.

[62] A mobile terminal according to the exemplary embodiment of the present invention comprises:

a measurement means that controls measurement of a status of a link to a base station;

a reception means that receives a radio signal from a preset radio transmission source other than the base station; and a means that prepares report data of the measurement result for the base station and reports the report data to the base station;

the mobile terminal controlling, in accordance with the reception status of a radio signal from the preset radio transmission source by the reception means, the execution of the measurement on the link status by the measurement means, in a mode set by a measurement instruction from the base station, the mobile terminal making a report to the base station on occurrence of a preset event that is to be a clue to report the measurement result to the base station, the report including the information regarding the link status; or the information regarding the link status, the information regarding the reception status of a radio signal from the radio transmission source, and/or the information obtained from the radio signal.

[63] A mobile terminal according to the exemplary embodiment of the present invention comprises a measurement means that controls measurement of a status of a link to a base station;

a reception means that receives a radio signal from a preset radio transmission source other than the base station; and a means that prepares report data of the measurement result for the base station and reports the report data to the base station;

the link status being measurement by the measurement means on receipt of a measurement instruction from the base station, the radio signal from the preset radio transmission source being received by the reception means in case a preset event that may become a clue of reporting the measurement result to the base station has occurred after the measurement, the mobile terminal controlling, the execution of reporting to the base station in accordance with the reception status of a radio signal received by the reception means from the preset radio transmission source, the report including the information regarding the link status; or the information regarding the link status, the information regarding the reception status of a radio signal from the radio transmission source and/or the information obtained from the information and/or the radio signal.

[64] In the mobile terminal according to the exemplary embodiment [63], the radio signal from the preset radio transmission source includes a GPS (Global Positioning System) signal, a report is made to the base station in case the GPS location information is obtained within a preset time period or in case the strength of the GPS electric field is not less than a preset threshold value, and the report includes information regarding the link status; or the information regarding the link status, and one of the GPS location information and the time needed in obtaining the GPS location information.

[65] A mobile terminal according to the exemplary embodiment of the present invention comprises a measurement means that controls the measurement of a status of a link to a base station;

a reception means that receives a radio signal from a preset radio transmission source other than the base station; and a means that prepares report data of the measurement result for the base station and reports report data to the base station;

the execution of the measurement on the link status by the measurement means being controlled, in a mode set by a measurement instruction from the base station, in accordance with the reception status of a radio signal from the preset radio transmission source by the reception means, the mobile terminal making a report to the base station on occurrence of a preset event that is to be a clue to report the measurement result to the base station, the report including the information regarding the link status; or the information regarding the link status, the information regarding the reception status of a radio signal from the radio transmission source and/or the information obtained from the radio signal.

[66] A mobile terminal according to the exemplary embodiment of the present invention comprises a reception means that receives a radio signal from a preset radio transmission source other than a base station; and a means that makes a report to the base station;

the reception means receiving the radio signal from the preset radio transmission source on occurrence of a preset event that becomes a trigger for reporting measurement result to the base station, reporting to the base station being controlled, depending on the reception state by the reception means of the radio signal from a preset radio transmission source.

The particular exemplary embodiments or examples may be modified or adjusted within the gamut of the entire disclosure of the present invention, inclusive of claims, based on the fundamental technical concept of the invention. Further, variegated combinations or selection of elements disclosed herein may be made within the framework of the claims. That is, the present invention may encompass various modifications or corrections that may occur to those skilled in the art in accordance with and within the gamut of the entire disclosure of the present invention, inclusive of claims and the technical concept of the present invention.

What is claimed is:

1. A mobile terminal comprising:
   a reception unit that obtains a reception status of a radio signal from a preset radio transmission source other than a base station; and
   a control unit that controls, in accordance with the reception status of a radio signal from the preset radio transmission source, the execution of measurement on a link status by the mobile terminal and/or the execution of reporting of the measurement result on the link status to a base station,
   wherein the mobile terminal obtains the location information of the mobile terminal on occurrence of a preset event by performing a trial operation of obtaining the location information of the mobile terminal, and wherein,
   in case the location information is obtained within a preset time period, the mobile terminal transmits the time needed in obtaining the location information and the information on the event that occurs as the report to the base station.

2. A mobile terminal comprising:
   a reception unit that obtains a reception status of a radio signal from a preset radio transmission source other than a base station; and
   a control unit that controls, in accordance with the reception status of a radio signal from the preset radio transmission source, the execution of measurement on a link status by the mobile terminal and/or the execution of reporting of the measurement result on the link status to a base station,
   wherein, in case a measurement instruction from the base station indicates that control is to be performed based on whether or not the location information can be obtained, the mobile terminal performs a trial operation of obtaining the location information of the mobile terminal, and the mobile terminal controls the measurement on the link status, depending on whether or not the location information is obtained within a preset time period.

3. The mobile terminal according to claim 2, wherein the mobile terminal makes a report on the measurement result of the link status to the base station, in response to occurrence of a preset event.

4. The mobile terminal according to claim 2, wherein the information on whether or not control based on whether or not the location information can be obtained is to be made is set on the side of a management server that performs adjustment of a radio parameter regarding the base station, the information being notified from the management server to the base station, the base station transmitting the information as the measurement instruction.

5. A mobile terminal comprising:
   a reception unit that obtains a reception status of a radio signal from a preset radio transmission source other than a base station; and
   a control unit that controls, in accordance with the reception status of a radio signal from the preset radio transmission source, the execution of measurement on a link status by the mobile terminal and/or the execution of reporting of the measurement result on the link status to a base station,
   wherein the mobile terminal executes measurement on the link status, in accordance with a measurement instruction from the base station,
   performs a trial operation of obtaining the location information of the terminal, responsive to an occurrence of a preset event, and
   makes a report on the information of the event to the base station, depending on whether or not the location information is obtained within a preset time period.

6. A mobile terminal comprising:
   a reception unit that obtains a reception status of a radio signal from a preset radio transmission source other than a base station; and
   a control unit that controls, in accordance with the reception status of a radio signal from the preset radio transmission source, the execution of measurement on a link status by the mobile terminal and/or the execution of reporting of the measurement result on the link status to a base station,
   wherein the mobile terminal performs a trial operation of obtaining the location information of the terminal in case a measurement instruction from the base station indicates that control, based on whether or not the location information can be obtained is to be exercised, and
   controls the execution of the measurement on the link status, depending on whether the reception quality of the location information is higher or lower than a preset threshold value.

7. The mobile terminal according to claim 6, wherein the mobile terminal makes a report on the measurement result of the link status to the base station in response to occurrence of a preset report event.

8. A mobile terminal comprising:
   a reception unit that obtains a reception status of a radio signal from a preset radio transmission source other than a base station; and
   a control unit that controls, in accordance with the reception status of a radio signal from the preset radio transmission source, the execution of measurement on a link status by the mobile terminal and/or the execution of reporting of the measurement result on the link status to a base station,
   wherein the mobile terminal performs the measurement on the link status in accordance with the measurement instruction from the base station, performs a trial operation of obtaining the location information of the terminal in response to occurrence of a preset event, and controls reporting to the base station of the information of the event that has occurred, depending on whether the reception quality of the location information is higher or lower than a preset threshold value.

9. A mobile terminal comprising:

a reception unit that obtains a reception status of a radio signal from a preset radio transmission source other than a base station; and a control unit that controls, in accordance with the reception status of a radio signal from the preset radio transmission source, the execution of measurement on a link status by the mobile terminal and/or the execution of reporting of the measurement result on the link status to a base station, wherein the mobile terminal performs a trial operation of obtaining the location information of the mobile terminal on occurrence of a preset event, and controls reporting to the base station of the information of the event that has occurred, depending on whether or not the location information is obtained within the preset time.

10. A mobile terminal comprising:

a reception unit that receives a GPS (Global Positioning System) wave and/or a preset television broadcasting or radio broadcasting signal, the mobile terminal using, as surrounding environment information thereof, a reception quality of the GPS (Global Positioning System) wave received by the mobile terminal or time needed to obtain the GPS location information and/or the reception quality of preset television broadcasting or radio broadcasting; and a control unit that controls, based on the surrounding environment information, the execution of measurement on a link status performed by the mobile terminal and/or reporting of the measurement on the link status to the base station, wherein the mobile terminal performs a trial operation of obtaining the GPS location information on receipt of a command for measurement on the link status from the base station, and wherein the mobile terminal performs a control such that the measurement on the link status and reporting of the measurement on the link status to the base station is allowed for one surrounding environment, and the measurement on the link status and reporting of the measurement on the link status to the base station is not allowed for another surrounding environment.

11. The mobile terminal according to claim 10, wherein the mobile terminal transmits information on the surrounding environment to the base station as being a part of the report of the measurement result of the link status.

12. A mobile terminal comprising:

a reception unit that receives a GPS (Global Positioning System) wave and/or a preset television broadcasting or radio broadcasting signal, the mobile terminal using, as surrounding environment information thereof, a reception quality of the GPS (Global Positioning System) wave received by the mobile terminal or time needed to obtain the GPS location information and/or the reception quality of preset television broadcasting or radio broadcasting; and a control unit that controls, based on the surrounding environment information, the execution of measurement on a link status performed by the mobile terminal and/or reporting of the measurement on the link status to the base station, wherein the mobile terminal performs a trial operation of obtaining the GPS location information on receipt of a command for measurement on the link status from the base station, and performs the measurement of the link state in case estimation of the GPS location information has met success, and reports the measurement result of the link status to the base station.

13. A mobile terminal comprising:

a reception unit that receives a GPS (Global Positioning System) wave and/or a preset television broadcasting or radio broadcasting signal, the mobile terminal using, as surrounding environment information thereof, a reception quality of the GPS (Global Positioning System) wave received by the mobile terminal or time needed to obtain the GPS location information and/or the reception quality of preset television broadcasting or radio broadcasting; and a control unit that controls, based on the surrounding environment information, the execution of measurement on a link status performed by the mobile terminal and/or reporting of the measurement on the link status to the base station, wherein the mobile terminal performs a trial operation of obtaining the GPS location information on receipt from the base station of an instruction for measurement on the link status, and performs the measurement on the link status in case the estimation of the GPS location information has failed and reports the measurement result of the link status to the base station.

14. A mobile terminal comprising:

a reception unit that receives a GPS (Global Positioning System) wave and/or a preset television broadcasting or radio broadcasting signal, the mobile terminal using, as surrounding environment information thereof, a reception quality of the GPS (Global Positioning System) wave received by the mobile terminal or time needed to obtain the GPS location information and/or the reception quality of preset television broadcasting or radio broadcasting; and a control unit that controls, based on the surrounding environment information, the execution of measurement on a link status performed by the mobile terminal and/or reporting of the measurement on the link status to the base station, wherein the mobile terminal performs a cell search in case of a failure of a radio link of a serving cell that is currently offering a service, and performs a trial operation for obtaining the GPS location information, performs measurement on link statuses of neighboring cells in case the GPS location information has been obtained with success, and reports the measurement result on the link status, on re-connection to another cell, to a base station of the other cell.

15. The mobile terminal according to claim 14, wherein the mobile terminal transmits the time needed in obtaining the GPS location information, along with the report, to the base station.

* * * * *